US010061467B2

United States Patent
Brunsch et al.

(10) Patent No.: US 10,061,467 B2
(45) Date of Patent: Aug. 28, 2018

(54) PRESENTING A MESSAGE IN A COMMUNICATION SESSION

(71) Applicant: Microsoft Technology Licensing, LLC, Redmond, WA (US)

(72) Inventors: Devi Brunsch, Seattle, WA (US); Jason Thomas Faulkner, Seattle, WA (US); Mark Robert Swift, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 14/806,291

(22) Filed: Jul. 22, 2015

(65) Prior Publication Data

US 2016/0306504 A1   Oct. 20, 2016

Related U.S. Application Data

(60) Provisional application No. 62/148,426, filed on Apr. 16, 2015.

(51) Int. Cl.
| | |
|---|---|
| *G06F 3/00* | (2006.01) |
| *G06F 3/0481* | (2013.01) |
| *H04L 12/58* | (2006.01) |
| *H04M 1/725* | (2006.01) |
| *H04N 7/14* | (2006.01) |
| *H04L 29/06* | (2006.01) |

(52) U.S. Cl.
CPC ............ *G06F 3/0481* (2013.01); *H04L 51/04* (2013.01); *H04L 51/046* (2013.01); *H04L 65/1083* (2013.01); *H04M 1/72547* (2013.01); *H04M 1/72552* (2013.01); *H04N 7/14* (2013.01)

(58) Field of Classification Search
CPC ..... G06F 3/0481; H04N 7/15; H04L 12/1827; H04L 65/1083; H04L 51/04; H04L 51/046
See application file for complete search history.

(56) References Cited

U.S. PATENT DOCUMENTS

| | | | |
|---|---|---|---|
| 6,304,648 | B1 | 10/2001 | Chang |
| 6,559,863 | B1 * | 5/2003 | Megiddo ............. H04L 12/1827 |
| | | | 348/14.08 |
| 7,081,915 | B1 | 7/2006 | Hamilton |

(Continued)

FOREIGN PATENT DOCUMENTS

| | | |
|---|---|---|
| WO | 2011137296 A2 | 11/2011 |
| WO | 2012178121 A1 | 12/2012 |

OTHER PUBLICATIONS

"International Search Report and Written Opinion", Application No. PCT/US2016/027050, dated Jul. 1, 2016, 13 pages.

(Continued)

*Primary Examiner* — Haoshian Shih

(57) ABSTRACT

Techniques for presenting a message in a communication session are described. In at least some embodiments, a message is sent by a participant in a communication session. The message is presented in a graphical user interface (GUI) for the communication session and visually linked to a visual representation of the participant. According to one or more implementations, a number of messages that are presented in a GUI for a communication session is throttled.

20 Claims, 20 Drawing Sheets

(56) References Cited

U.S. PATENT DOCUMENTS

| | | | |
|---|---|---|---|
| 7,386,799 B1* | 6/2008 | Clanton | A63F 13/12 |
| | | | 715/753 |
| 7,454,460 B2 | 11/2008 | Ivashin | |
| 7,554,571 B1 | 6/2009 | Beck et al. | |
| 8,411,130 B2 | 4/2013 | Lee et al. | |
| 8,701,020 B1 | 4/2014 | Fulcher et al. | |
| 8,711,198 B2 | 4/2014 | Malzbender et al. | |
| 8,887,069 B2 | 11/2014 | Tipirneni | |
| 8,966,404 B2 | 2/2015 | Lee et al. | |
| 9,449,614 B2 | 9/2016 | Vos et al. | |
| 2005/0099492 A1* | 5/2005 | Orr | H04L 12/1827 |
| | | | 348/14.08 |
| 2005/0210394 A1 | 9/2005 | Crandall et al. | |
| 2007/0006094 A1 | 1/2007 | Canfield et al. | |
| 2007/0211141 A1 | 9/2007 | Christiansen | |
| 2007/0279484 A1 | 12/2007 | Derocher et al. | |
| 2010/0103245 A1 | 4/2010 | Decker et al. | |
| 2010/0309284 A1 | 12/2010 | Samadani et al. | |
| 2011/0035681 A1 | 2/2011 | Mandel et al. | |
| 2012/0166534 A1 | 6/2012 | Bentley et al. | |
| 2012/0182377 A1 | 7/2012 | Wang et al. | |
| 2012/0200658 A1 | 8/2012 | Duckworth | |
| 2013/0063542 A1 | 3/2013 | Bhat et al. | |
| 2013/0120522 A1* | 5/2013 | Lian | H04N 7/15 |
| | | | 348/14.08 |
| 2013/0169742 A1 | 7/2013 | Wu et al. | |
| 2013/0198629 A1 | 8/2013 | Tandon et al. | |
| 2013/0215214 A1 | 8/2013 | Dhopte et al. | |
| 2013/0311935 A1 | 11/2013 | Setlur et al. | |
| 2014/0063177 A1 | 3/2014 | Tian et al. | |
| 2014/0071223 A1 | 3/2014 | Chatterjee et al. | |
| 2014/0317532 A1* | 10/2014 | Ma | G06F 3/0481 |
| | | | 715/753 |
| 2015/0038121 A1 | 2/2015 | Koum et al. | |
| 2015/0049162 A1 | 2/2015 | Kurupacheril et al. | |
| 2015/0121251 A1 | 4/2015 | Kadirvel et al. | |
| 2015/0296178 A1 | 10/2015 | Aarrestad et al. | |
| 2016/0134838 A1 | 5/2016 | Tangeland et al. | |
| 2016/0308920 A1 | 10/2016 | Brunsch et al. | |
| 2016/0359941 A1 | 12/2016 | Kvaal et al. | |

OTHER PUBLICATIONS

"Second Written Opinion", Application No. PCT/US2016/027056, dated Mar. 14, 2017, 7 pages.

"Second Written Opinion", Application No. PCT/US2016/027050, dated Mar. 14, 2017, 8 pages.

Folk-Williams,"Real-Time Online Video Meetings", Retrieved From: <http://www.mediate.com/mobile/article.cfm?id=5450> May 13, 2015, Nov. 2009, 3 pages.

"The Vidyo Experience", Retrieved from: <http://www.vidyo.com/products/use/> May 12, 2015, Mar. 16, 2015, 6 pages.

"Spontania User Guide (Version 5.2)", Retrieved on: May 12, 2015—Available at: <http://www.spontania.com/documentation/Portal/Spontania_User_Guide_EN_CL1.pdf>, 83 pages.

"International Search Report and Written Opinion Issued in PCT Application No. PCT/US2016/027056", dated Jul. 14, 2016, 11 Pages.

"Non-Final Office Action", U.S. Appl. No. 14/806,203, dated Apr. 17, 2017, 15 pages.

"International Preliminary Report on Patentability", Application No. PCT/US2016/027050, dated Jul. 3, 2017, 9 pages.

"International Preliminary Report on Patentability Issued in PCT Application No. PCT/US2016/027056", dated Jul. 12, 2017, 08 Pages.

"Non Final Office Action Issued in U.S. Appl. No. 14/806,203", dated Jun. 29, 2018, 16 Pages.

* cited by examiner

| Standing Row Elements | Single User Visual | Multiple User Visual |
|---|---|---|
| Face = 1 | X | |
| Face > 1, incoming video = 16:9 | | X |
| Face > 1, incoming video = 4:3 | X | |
| Video from conference room | | X |
| Portrait video from mobile device | X | |
| User-Specific Avatar | X | |
| No User-Specific Avatar | X | |
| Face=1, share mode | | X |
| ⋮ | ⋮ | ⋮ |

PRESENTING A MESSAGE IN A COMMUNICATION SESSION

RELATED APPLICATION

This application claims priority to U.S. Provisional App. No. 62/148,426, filed on Apr. 16, 2015 and titled "Presenting a Message in a Communication Session," the entire disclosure of which is incorporated by reference herein.

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems enable users to exchange various types of media during communication sessions and may be integrated with multimodal communication systems providing different kinds of communication and collaboration capabilities. Such integrated systems are sometimes referred to as Unified Communication and Collaboration (UC&C) systems.

While modern communication systems provide for increased flexibility in communications, they also present a number of implementation challenges. For instance, a communication session between different users at different devices may include not only an exchange of voice and video data, but may also include messages exchanged between participants, such as text, hyperlinks, photos, pre-recorded video, and so forth. Enabling messages to be presented in such a way that the messages are not missed by participants in a communication session presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for presenting a message in a communication session are described. In at least some embodiments, a message is sent by a participant in a communication session. The message is presented in a graphical user interface (GUI) for the communication session and visually linked to a visual representation of the participant. According to one or more implementations, a number of messages that are presented in a GUI for a communication session is throttled.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
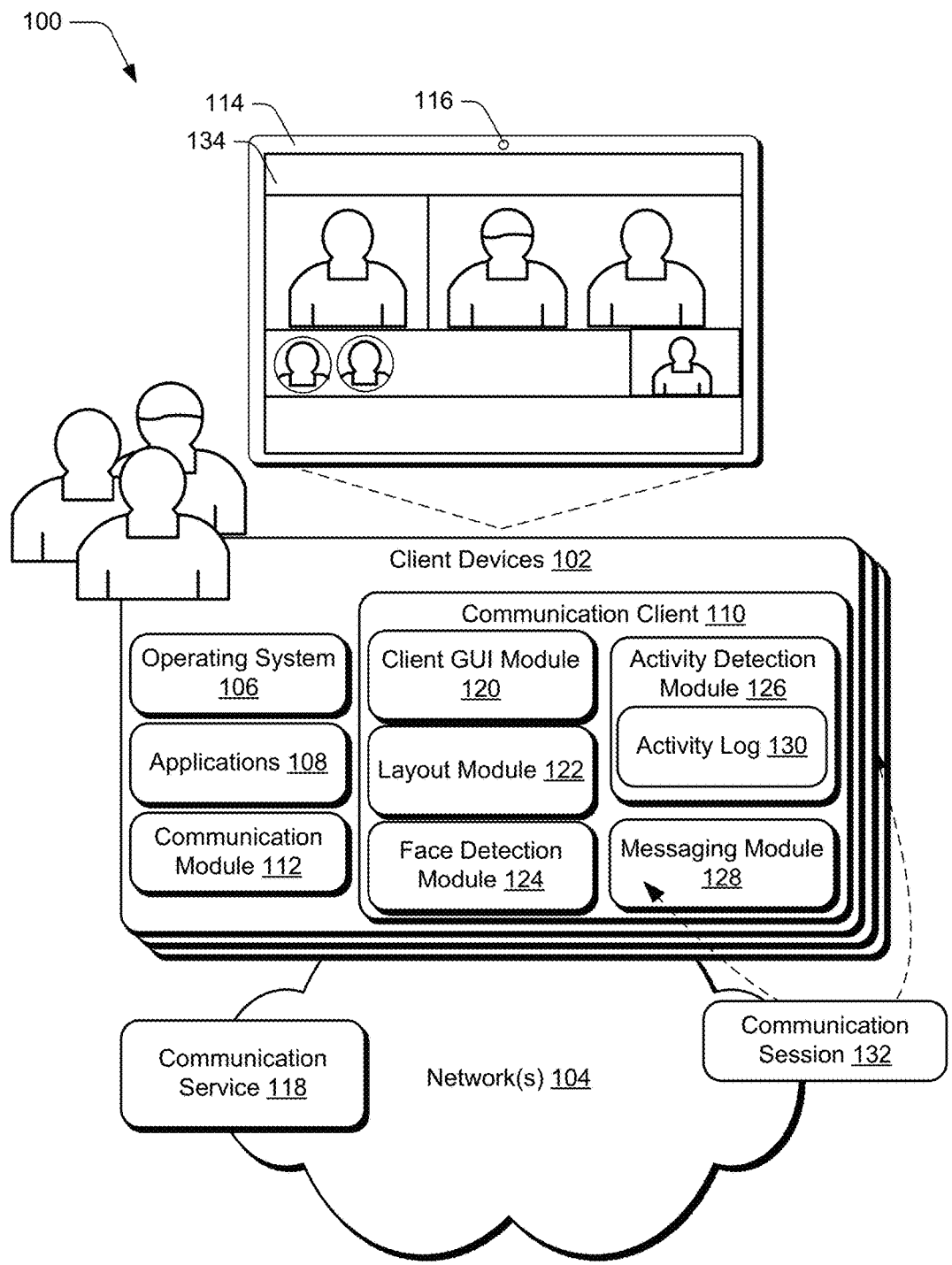
FIG. 1 is an illustration of an environment in an example implementation that is operable to employ techniques discussed herein.

Techniques for presenting a message in a communication session are described. In at least some implementations, a communication session refers to a real-time exchange of communication media between different communication endpoints. Examples of a communication session include a Voice over Internet Protocol (VoIP) call, a video call, text messaging, a file transfer, content sharing, and/or combinations thereof. In at least some embodiments, a communication session represents a Unified Communication and Collaboration (UC&C) session.

According to various implementations, a communication session is established and a graphical user interface (GUI) for the communication session is presented to different participants in the communication session. The GUI is populated with visual representations of the participants, such as live video feeds, avatars, and so forth. While the communication session is in progress, a participant sends a message as part of the communication session, such as a text-based message, a photograph, a hyperlink, and so forth. Accordingly, the message is displayed within the GUI and visually linked to a visual representation of the participant to provide a visual cue that the message was sent by the participant. For instance, the message is presented within a primary area of the GUI, such as overlaid over a portion of the visual representation of the participant.

In at least some implementations, a way in which the message is visually linked to the visual representation is based on how active the participant is in the communication session. For instance, the message may be visually linked in a different way for an active participant than for a passive participant.

Thus, techniques described herein provide visually pleasing and intuitive ways for presenting messages to participants in a communication session such that the messages are less likely to be missed by the participants. Further, a number of user interactions required to view a message sent during a communication session is reduced by automatically presenting the message in a primary area of a GUI for the communication session.

According to one or more implementations, multiple messages are sent by participants in a communication session. The messages, for instance, are sent concurrently and/or in quick succession to one another. Accordingly, a rate at which the messages are received is compared to a message threshold that specifies a threshold number of messages for a specified period of time. If the messages exceed the message threshold, a message indicator is presented that provides a visual cue that the messages are available to be viewed. For instance, to avoid overwhelming participants with many messages presented together, the messages are not automatically presented but are buffered for later presentation. A participant may select the message indicator to cause a message window to be displayed that includes the messages. Thus, techniques described herein can throttle a number of messages that are presented to participants in a communication session at a particular time to avoid user frustration and reduce clutter of a GUI for the communication session.

In the following discussion, an example environment is first described that is operable to employ techniques described herein. Next, sections entitled "Example Implementation Scenarios for Visual Configuration" and "Example Procedures for Visual Configuration" describe some example implementation scenarios and procedures for visual configuration for a communication session in accordance with one or more embodiments. Following this, sections entitled "Example Implementation Scenarios for Message Presentation" and "Example Procedures for Message Presentation" describe some example implementation scenarios and procedures for message presentation in a communication session in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques described herein. Generally, the environment 100 includes various devices, services, and networks that enable communication via a variety of different modalities. For instance, the environment 100 includes client devices 102 connected to a network 104. The client devices 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), a mixed reality device (e.g., a virtual reality (VR) headset), and so forth. For purposes of the following discussion attributes of a single client device 102 are discussed, but it is to be appreciated that the discussed attributes similarly apply across the different instances of the client devices 102.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The client devices 102 include a variety of different functionalities that enable various activities and tasks to be performed. For instance, the client device 102 includes an operating system 106, applications 108, a communication client 110, and a communication module 112. Generally, the operating system 106 is representative of functionality for abstracting various system components of the client device 102, such as hardware, kernel-level modules and services, and so forth. The operating system 106, for instance, can abstract various components of the client device 102 to the applications 108 to enable interaction between the components and the applications 108.

The applications 108 represent functionalities for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication client 110 is representative of functionality to enable different forms of communication via the client device 102. Examples of the communication client 110 include a voice communication application (e.g., a VoIP client), a video communication application, a messaging application, a content sharing application, a unified communication & collaboration (UC&C) application, and combinations thereof. The communication client 110, for instance, enables different communication modalities to be combined to provide diverse communication scenarios.

The communication module 112 is representative of functionality for enabling the client device 102 to communicate data over wired and/or wireless connections. For instance, the communication module 112 represents hardware and logic for data communication over the network 104 via a variety of different wired and/or wireless technologies and protocols.

The client device 102 further includes a display device 114 and a camera 116. The display device 114 generally represents functionality for visual output for the client device 102. Additionally, the display device 114 represents functionality for receiving various types of input, such as touch input, pen input, and so forth.

The camera 116 is representative of functionality to capture and record visual images, such as still images, video, and so on. The camera 116 includes various image capture components, such as apertures, lenses, mirrors, prisms, electronic image sensors, a video capture card, and so on.

In at least some implementations, the communication client 110 represents an interface to a communication service 118. Generally, the communication service 118 is representative of a service to perform various tasks for management of communication between the different client devices 102. The communication service 118, for instance, can manage initiation, moderation, and termination of communication sessions between the communication clients 110 of the different client devices 102.

The communication service 118 maintains a presence across many different networks and can be implemented according to a variety of different architectures, such as a cloud-based service, a distributed service, a web-based service, and so forth. Examples of the communication service 118 include a VoIP service, an online conferencing service, a UC&C service, and so forth.

Further to techniques described herein, the communication client 110 includes a client graphical user interface (GUI) module 120, a layout module 122, a face detection module 124, an activity detection module 126, and a messaging module 128. The client GUI module 120 is representative of functionality to generate and output a GUI for the communication client 110. The layout module 122 is representative of functionality to perform various visual arrangement and layout calculations for the client GUI module 120. For instance, as detailed below, the layout module 122 receives various state information for a communication session, and generates visual arrangement data that specifies how visual attributes of a GUI for the communication session are to be visually arranged.

The face detection module 124 is representative of functionality to detect images of faces in incoming video, such as video captured from the camera 116 and/or video data received from other devices. In at least some implementations, the face detection module 124 quantifies a number of different face images detected in a particular video feed, and communicates this information to other functionalities. For instance, the face detection module 124 communicates a number of face images detected in a particular video feed to the layout module 122. The layout module 122 uses this number to determine a visual layout for displaying the particular video feed, such as an amount of screen space to allot for displaying the video feed.

The activity detection module 126 is representative of functionality to detect various types of activity during a communication session, and to categorize and/or tag participants in the communication session based on their respective activity levels. For instance, a participant that frequently speaks during a communication session such that the activity detection module 126 detects frequent voice signal in the participant's media stream, the activity detection module 126 tags the participant as an active participant. Further, if a different participant rarely speaks during a communication session such that little or no voice signal is detected by the activity detection module 126 in the participant's media stream, the participant is tagged as a passive participant. The activity detection module 126 maintains an activity log 130 that stores activity information for different participants in communication sessions.

The activity log 130, for instance, includes user identifiers for different individual participants, and includes activity flags that specify whether the individual participants are active participants or passive participants. Further, the activity log 130 may include activity scores for active participants that differentiate more active participants from less active participants. The activity detection module 126 provides this information to different entities and functionalities to inform various decisions pertaining to a communication session.

For example, the activity detection module 126 communicates activity tags for different participants in a communication session to the layout module 122, and the layout module 122 uses this activity information to determine a visual layout of a GUI for the communication session. For instance, and as detailed below, a visual representation of an active participant in a communication session is displayed more prominently (e.g., larger) than a visual representation of a passive participant. Further, changes in activity levels during a communication session may occur such that participants are dynamically evaluated by the activity detection module 126 for their activity level, and can be retagged should their activity levels change.

The messaging module 128 is representative of functionality to handle different messaging tasks for the communication client 110. For instance, the messaging module 128 receives incoming messages from participants in a communication session, and instructs the layout module 122 how to visually present the messages. Generally, the messaging module 128 is configured to handle a variety of different types of messages, such as text messages, media messages (e.g., photos, videos, audio, and so forth), hyperlinks, files, and so forth. As further detailed in the following discussion, the messaging module 128 enables messages to be presented during a communication session such that the messages are consumable by participants in the communication session in a seamless and less obtrusive manner than typical messaging techniques.

While the various modules of the communication client 110 are depicted as being implemented on the client device 102, it is to be appreciated that in some additional or alternative implementations, functionality of one or more of the modules may be partially or wholly implemented via a network-based service, such as the communication service 118. For instance, the communication service 118 may utilize data captured from media streams of a communication session to make layout decisions for rendering GUIs at devices involved in the communication session.

The environment 100 further depicts that a communication session 132 is in progress between different instances of the client devices 102. The communication session 132, for instance, represents a real-time exchange of voice and video between the different client devices 102. As part of the communication session 132, a client GUI 134 is displayed on the display device 114. Generally, the client GUI 134 includes visual representations of different attributes of the communication session 132. For instance, the client GUI 134 includes visual representations of participants in the communication session 132, such as users of the different client devices 102. As further detailed below, techniques described herein are employed to determine a visual arrangement for the client GUI 134 based on various factors, such as a total number of participants in the communication session, a number of participants present at a particular location, activity levels for the individual participants, and so forth.

Having described an example environment in which the techniques described herein may operate, the following sections begin with a discussion of example scenarios and procedures for visual configuration for communication session participants, followed by a discussion of example scenarios and procedures for presenting messages in a communication session in accordance with one or more implementations.

Example Implementation Scenarios for Visual Configuration

The following section describes some example implementation scenarios for visual configuration for communication session participants in accordance with one or more implementations. The implementation scenarios may be implemented in the environment 100 discussed above, and/or any other suitable environment.

Figure 2:
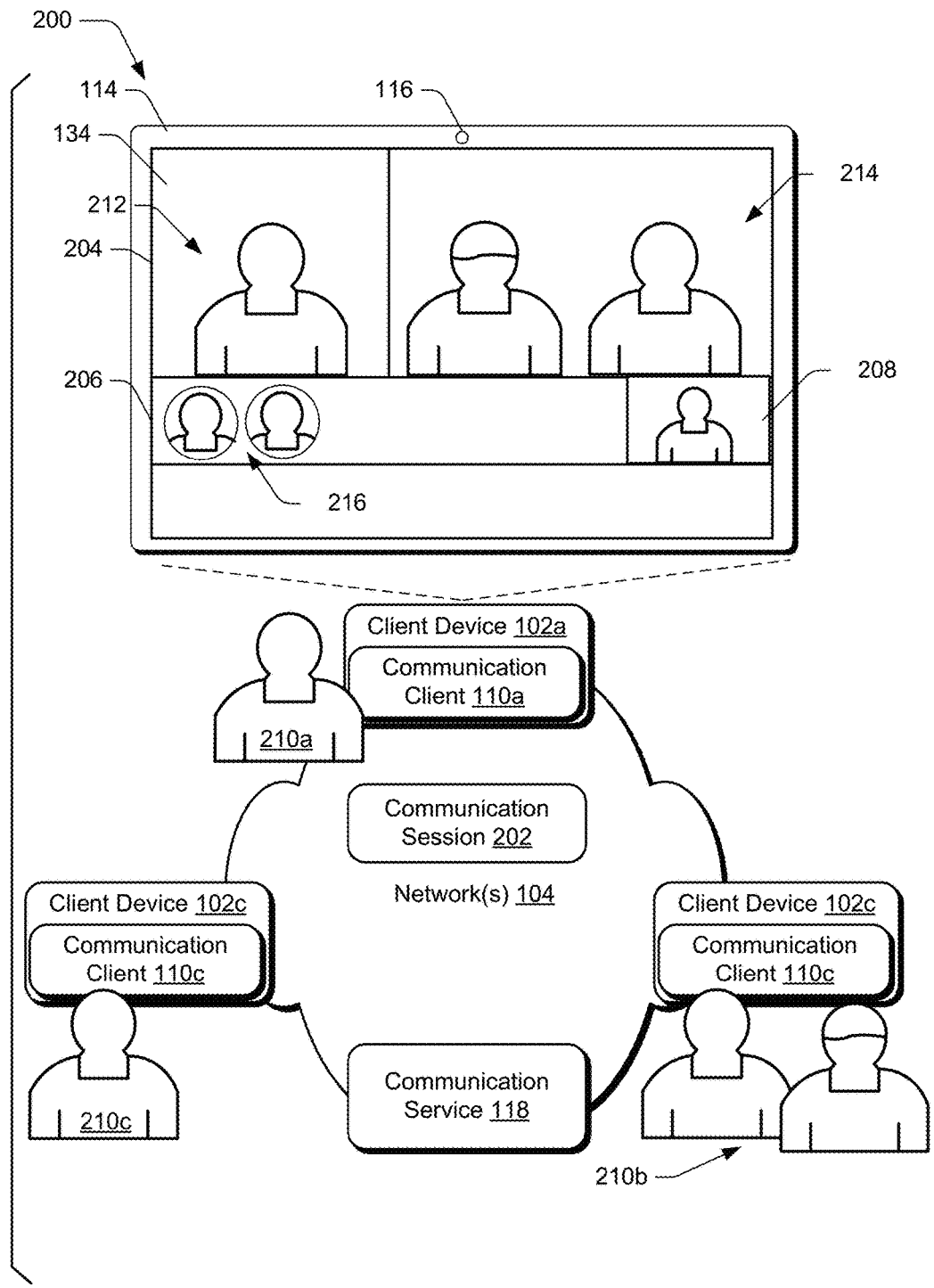
FIG. 2 depicts an example implementation scenario for displaying visual representations of users in a communication session in accordance with one or more embodiments.

FIG. 2 depicts an example implementation scenario 200 for displaying visual representations of users in a communication session in accordance with one or more implementations. The scenario 200 includes various entities and components introduced above with reference to the environment 100.

In the scenario 200, a communication session 202 is in progress between a client device 102a, a client device 102b, and a client device 102c. Generally, the client devices 102a-102c represent different instances of the client devices 102 introduced above. The communication session 202 represents an exchange of different communication media between the client devices 102a-102c, such as audio, video, files, media content, and/or combinations thereof. In this particular example, the communication session 202 involves a real-time exchange of voice data and video data between the client devices 102a-102c over the network 104. According to various implementations, the communication session 202 is managed by the communication service 118.

As part of the communication session 202, the display device 114 for the client device 102a displays the client GUI 134, which represents a GUI for the communication client 110. Displayed within the client GUI 134 are visual representations of participants (i.e., users) involved in the communication session. For instance, the client GUI 134 includes a standing row 204, a sitting row 206, and a preview window 208 that each display different visual representations ("user visuals") of participants in the communication session.

According to various implementations, the standing row 204 represents a region of the client GUI 134 that is initially populated with user visuals. For instance, during initiation of the communication session 202, the standing row 204 is populated with user visuals for the initial users to join the communication session 202. When the number of user visuals populated to the standing row reaches a threshold number, subsequent user visuals are populated to the sitting row 206. As further detailed below, while the communication session 202 is in progress, visual configuration of the standing row 204 and the sitting row 206 is determined at least in part based on user activity during the communication session. For instance, user visuals presented in the standing row 204 are larger than user visuals presented in the sitting row 206, and thus the standing row 204 may be reserved for user visuals for the most active users. The standing row 204, for instance, represents an active region of the client GUI 134. Those users that are less active and/or passive during the communication session 202 are represented in the sitting row 206. The sitting row 206, for example, represents a passive region of the client GUI 134.

The preview window 208 is populated with a user visual for a user 210a present at the client device 102a. For instance, a video feed from the camera 116 is presented within the preview window 208 as a notification to the user 210a that video feed from the camera 116 is being streamed to other client devices participating in the communication session 202.

According to techniques described herein, user visuals presented in the client GUI 134 are configured based on a number of users detected at the different client devices 102. For instance, the face detection module 124 at the client device 102c inspects a video feed captured at the client device 102c and detects a single face image for a user 210c in the video feed. Generally, the face detection module 124 may employ any suitable facial recognition technique. Thus, as part of the communication session 202, a communication client 110c of the client device 102c instructs a communication client 110a of the client device 102a to render video feed from the client device 102c according to a single user scenario. For instance, the communication client 110c notifies the communication client 110a that a single user image is present in video feed from the client device 102c. Thus, the communication client 110a crops the video feed from the client device 102c and presents the video feed as a single user visual 212 within the standing row 204. As depicted, the single user visual 212 includes a single visual representation of the user 210c.

The single user visual 212, for example, is generated by cropping a larger video frame received from the client device 102c. For instance, video feed received from the client device 102c as part of the communication session 202 has an aspect ratio that is different than that of the single user visual 212. In one example implementation, video feed is received from the client device 102c with a 16:9 aspect ratio. However, in response to ascertaining that a single user is present at the client device 102c, the layout module 122 for the client device 102a crops the video feed for display in the client GUI 134, such as to a 1:1 aspect ratio.

Continuing with the scenario 200, the face detection module 124 at the client device 102b inspects video feed captured at the client device 102b and detects multiple face images (e.g., two face images) for users 210b in the video feed. Thus, as part of the communication session 202, a communication client 110b of the client device 102b instructs the communication client 110a to render video feed from the client device 102b according to a multiple user scenario. For instance, the communication client 110b notifies the communication client 110a that a multiple user images are present in video feed from the client device 102b. Accordingly, the communication client 110a presents the video feed from the client device 102b as a multiple user visual 214 within the standing row 204. As depicted, the multiple user visual 214 includes a visual representation of the multiple users 210b.

In at least some implementations, the multiple user visual 214 is presented in an aspect ratio in which it is received in a video feed from the client device 102b, such as 16:9. Alternatively, the video feed from the client device may be cropped to enable the multiple user visual 214 to be fit within the standing row 204, while maintaining visual representations of the users 210b within the multiple user visual 214.

As further depicted in the scenario 200, the sitting row 206 includes user visuals 216 for other participants in the communication session 202. The user visuals 216, for example, represent users that joined the communication session 202 later than those represented in the standing row 204. Alternatively or additionally, the user visuals 202 represent users that are less active than those represented in the standing row 204.

According to various implementations, graphics for the various user visuals may be generated in various ways. For instance, real-time video feeds can be captured via cameras at the different client devices 102 and streamed as part of the communication session 202. Alternatively, a particular user visual may include a static image, such as an avatar and/or snapshot that represents a particular user. For instance, if a video feed at a particular client device 102 is not active and/or has poor quality, an avatar for a user of the client device is presented as a user visual. Alternatively or additionally, a user may select a snapshot control to manually capture a snapshot that is used as a user visual.

While the scenario 200 is discussed with reference to the displaying user visuals on the client device 102a, it is to be appreciated that similar logic may be applied to arranging and displaying user visuals on other client devices involved in the communication session, e.g., the client devices 102b, 102c.

Figure 3:
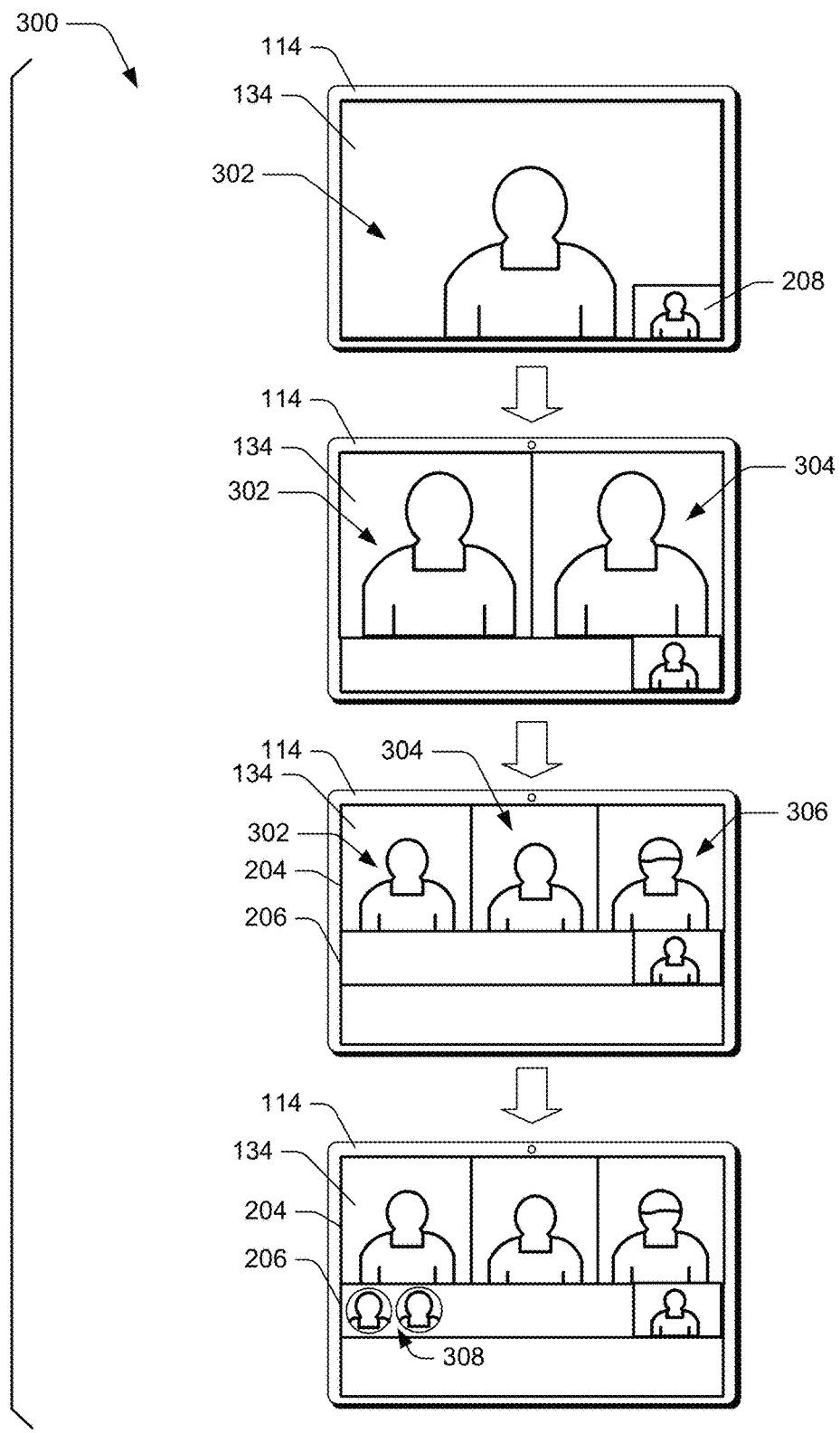
FIG. 3 depicts an example implementation scenario for displaying visual representations of users joining a communication session in accordance with one or more embodiments.

FIG. 3 depicts an example implementation scenario 300 for displaying visual representations of users joining a communication session in accordance with one or more implementations. The scenario 300 includes various entities and components introduced above with reference to the environment 100.

In the upper portion of the scenario 300, the client GUI 134 is displayed on the display device 114. Presented within the client GUI 134 is a user visual 302 and a preview window 208 that are presented for a communication session. Generally, the upper portion of the scenario 300 represents a scenario where two users have joined a communication session, i.e., a user represented by the user visual 302, and another user represented in the preview window 208. As depicted, when only two users are connected for a communication session, the user visual 302 is displayed as a full-window and/or full-screen visual. Further, the preview window 208 is presented as an inset to the user visual 302. While the user visual 302 is depicted with a single user, similar logic may be applied for multiple users at a single location/device such that the multiple users are depicted within the user visual 302.

Proceeding to the next portion of the scenario 300, a further user joins the communication session, and thus the user visual 302 is reduced in size to accommodate a user visual 304 for the further user. For instance, video feed for the different users is cropped such that the user visuals 302, 304 are of equal size and/or aspect ratio within the client GUI 134. Further, notice that the preview window 208 is presented in a region of the client GUI 134 outside of (e.g., beneath) the user visuals 302, 304.

Continuing to the next portion of the scenario 300, yet another user joins the communication session. Accordingly, the user visuals 302, 304 are reduced in size and/or aspect ratio to accommodate a user visual 306 for the incoming user. Thus, the user visuals 302-306 are presented as part of a standing row 204 for the client GUI 134, and a sitting row 206 is presented within the client GUI 134.

Proceeding to the lower portion of the scenario 300, further users join the communication session, and thus user visuals 308 for the further users are populated to the sitting row 206. For instance, the standing row 204 is consider to be at a maximum visual capacity such that visuals for further users are populated to the sitting row 206. As further discussed below, reconfiguration of the standing row 204 and the sitting row 206 can occur based on differences in activity levels for users participating in the communication session.

Thus, the scenario 300 illustrates that user visuals are populated to the client GUI 134 to maximize the size of the user visuals while allocating space equally within the standing row 204 until the standing row 204 is at maximum visual capacity. Further, once the standing row 204 is at maximum visual capacity, additional user visuals are populated to the sitting row 206.

Figure 4:
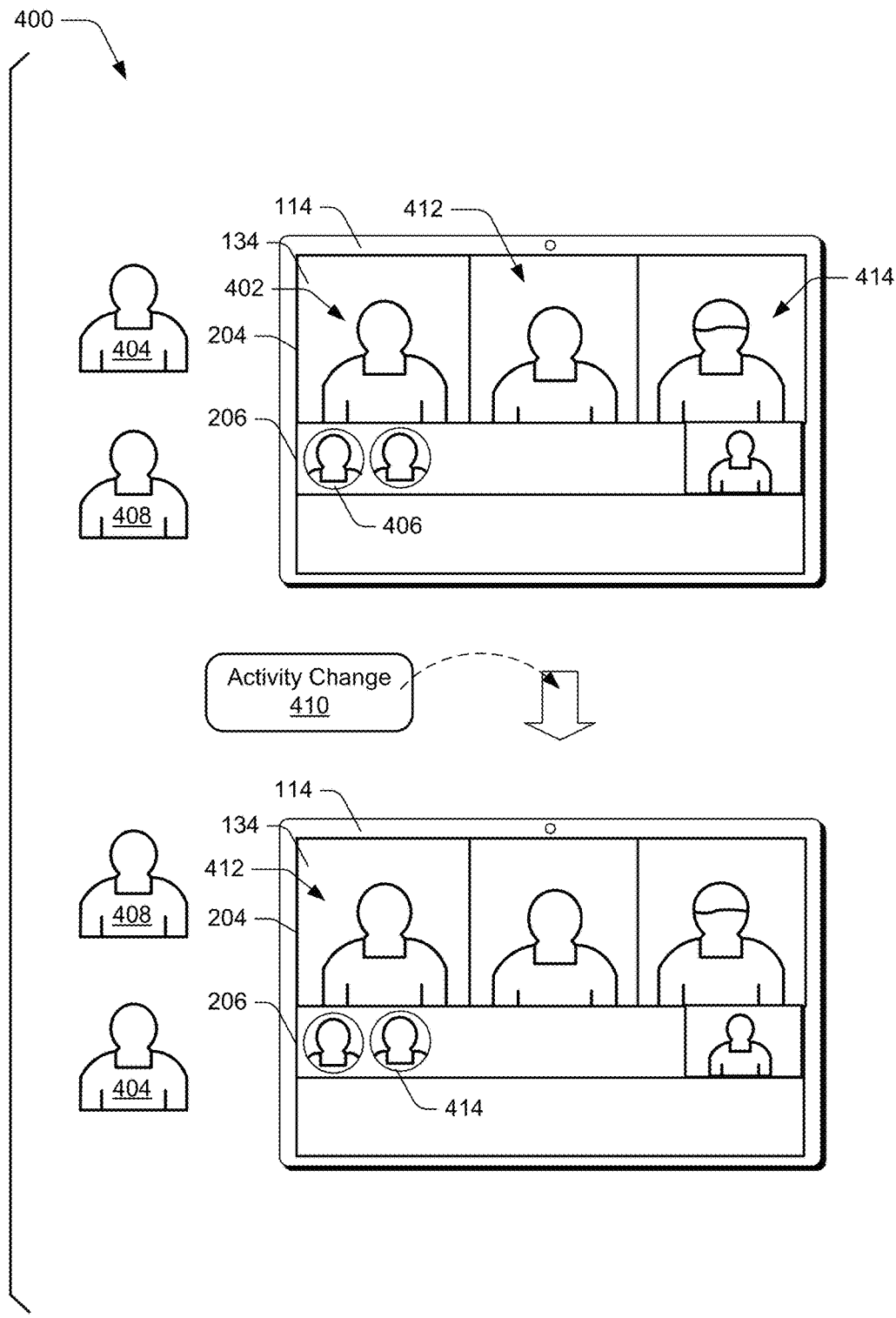
FIG. 4 depicts an example implementation scenario for arranging user visuals based on user activity in a communication session in accordance with one or more embodiments.

FIG. 4 depicts an example implementation scenario 400 for arranging user visuals based on user activity in a communication session in accordance with one or more implementations. The scenario 400 includes various entities and components introduced above with reference to the environment 100, and in at least some implementations represents an extension and/or variation of one or more of the scenarios 200, 300 described above.

The upper portion of the scenario 400 includes the client GUI 134 displayed on the display device 114 and with the standing row 204 and the sitting row 206 populated with user visuals for users participating in a communication session. As discussed above, the standing row 204 and the sitting row 206 can be populated with user visuals based on an order in which respective users join the communication session. Alternatively or additionally, the standing row 204 and the sitting row 206 can be populated with user visuals based on activity levels for respective users. For instance, the activity detection module 126 quantifies activity levels for participants in the communication session based on voice data detected in media streams from the different participant's respective client devices. Generally, activity level for a participant can be quantified in various ways, such as based on an aggregate amount of voice input detected from the participant, how recently voice data from the participant is detected, how frequently voice data from the participant is detected, and so forth.

Further to the scenario 400, the standing row 204 is populated with user visuals for the most active participants in the communication session. For example, the activity detection module 126 determines relative activity levels the participants in the communication session, and notifies the layout module 122 of the relative activity levels. The layout module 122 then utilizes the activity information to determine which user visuals are to be populated to the standing row 204, and which are to be populated to the sitting row 206. In this particular scenario, user visuals for the three most active participants are populated to the standing row 204 including a user visual 402 for an active participant 404.

Further, user visuals for the remaining participants are populated to the sitting row 206 including a user visual 406 for a less active participant 408.

Proceeding to the lower portion of the scenario 400, an activity change 410 is detected with reference to the participant 408. For instance, the activity detection module 126 detects that an activity level for the participant 408 increases, such as based on an increase in voice data detected from the participant 408. Thus, the activity detection module 126 provides the layout module 122 with updated activity information including an indication of the increase in the activity level for the participant 408. Based on the updated activity information, the layout module 122 identifies that the participant 404 is the least active participant currently represented in the standing row 204. Accordingly, the layout module 122 promotes the participant 408 to the standing row 204, and demotes the participant 404 to the sitting row 206. Thus a user visual 412 for the participant 408 replaces the user visual 402 in the standing row 204, and a user visual 414 is presented in the sitting row 206 for the user 404.

Further to the scenario 400, activity levels for the different participants are continually monitored and quantified such that changes to the standing row 204 and the sitting row 206 can be implemented in response to changes in activity level. For instance, a promotion to the standing row 204 and/or a demotion to the sitting row 206 is implemented in response to a further change in activity level for a participant in the communication session.

Figure 5:
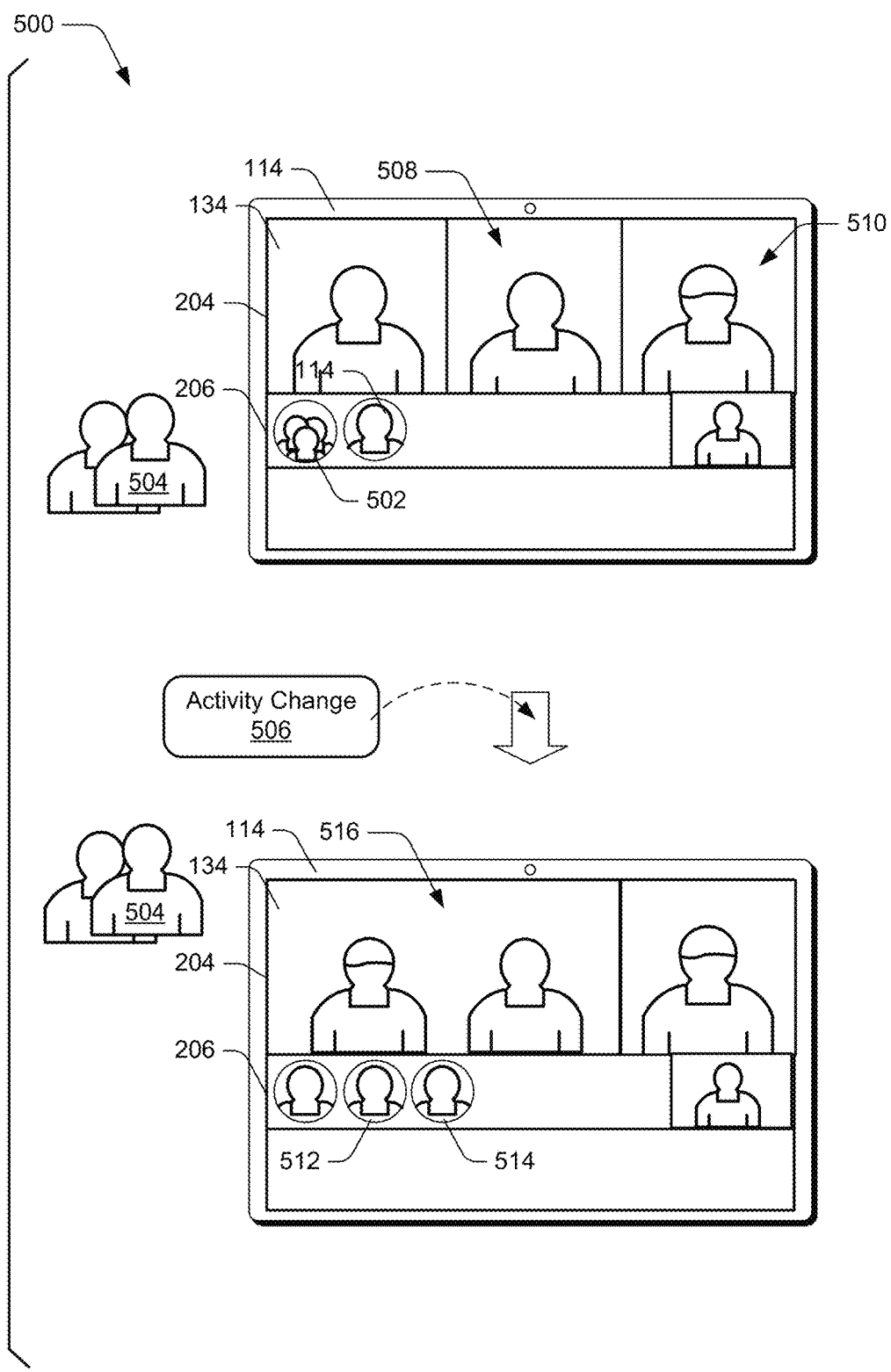
FIG. 5 depicts an example implementation scenario for arranging a multiple user visual based on user activity in a communication session in accordance with one or more embodiments.

FIG. 5 depicts an example implementation scenario 500 for arranging a multiple user visual based on user activity in a communication session in accordance with one or more implementations. The scenario 400 includes various entities and components introduced above with reference to the environment 100, and in at least some implementations represents an extension and/or variation of one or more of the scenarios 200-400 described above.

The upper portion of the scenario 500 includes the client GUI 134 displayed on the display device 114 and with the standing row 204 and the sitting row 206 populated with user visuals for users participating in a communication session. Generally, the standing row 204 and the sitting row 206 are populated based on various parameters, such as participant join order and/or activity level for the communication session.

The sitting row 206 includes a user visual 502 that represents multiple participants 504 that are present at a particular client device that is connected to the communication session. The face detection module 124, for instance, detects the participants 504 at the client device, and notifies the layout module 122 that multiple participants 504 are present at the client device. Accordingly, the layout module 122 uses the user visual 502 to represent the participants 504 in the sitting row 206.

Continuing to the lower portion of the scenario 500, an activity change 506 is detected with reference to the participants 504. For instance, the activity detection module 126 detects an increase in voice activity from the participants 506, such as by detecting voice data that exceeds a voice activity threshold in a media feed from the participants 504. Accordingly, the activity detection module 126 communicates updated activity information to the layout module 122, including an indication that the participants 504 are active participants in the communication session. Based on the updated activity information, the layout module 122 ascertains that the participants 504 are to be promoted to the standing row 204. Further, the layout module 122 determines that a multiple user visual is to be used to represent the participants 504. For instance, a face detection module 124 at a client device that captures video feed of the participants 504 notifies the layout module 122 that the video feed is to be rendered as a multiple user visual.

Based on the updated activity information from the activity detection module 126, the layout module ascertains that participants represented by user visuals 508, 512 are the two least active participants represented in the standing row 204. Accordingly, the layout module 122 demotes the least active participants to the sitting row 206 and promotes the participants 504 to the standing row 204. Thus, user visuals 512, 514 for the demoted participants are populated to the sitting row 206. Further, a multiple user visual 516 is populated to the standing row 204 to replace the user visuals 508, 510. The multiple user visual 516, for example, includes a video feed representing the multiple users 504.

According to various implementations, if user activity for the participants 504 decreases and/or if user activity for one or more of the participants represented in the sitting row 206 increases, the participants 504 may be demoted to the sitting row 206 such that the two most active participants represented in the sitting row 206 are promoted and represented in the standing row 204 to replace the multiple user visual 516.

Thus, the scenario 500 illustrates that techniques described herein can be employed to configure the client GUI 134 based on activity detected with reference to multiple users detected during a communication session.

Figure 6:
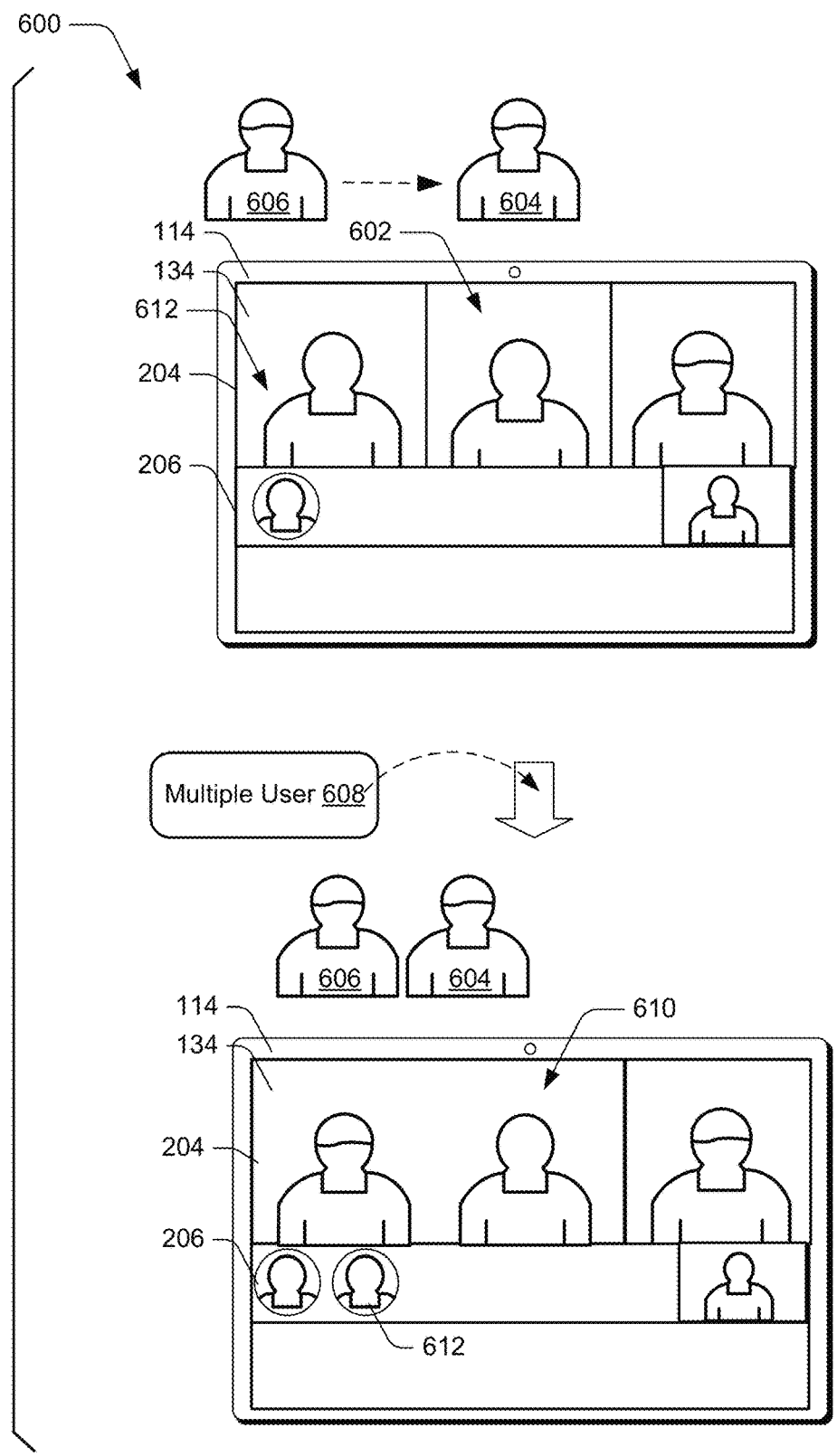
FIG. 6 depicts an example implementation scenario for arranging a client GUI for a communication session in response to an additional participant in accordance with one or more embodiments.

FIG. 6 depicts an example implementation scenario 600 for arranging a client GUI for a communication session in response to an additional participant in accordance with one or more implementations. The scenario 600 includes various entities and components introduced above with reference to the environment 100, and in at least some implementations represents an extension and/or variation of one or more of the scenarios 200-500 described above.

The upper portion of the scenario 600 includes the client GUI 134 displayed on the display device 114 and with the standing row 204 and the sitting row 206 populated with user visuals for users participating in a communication session. Generally, the standing row 204 and the sitting row 206 are populated based on various parameters, such as participant join order and/or activity level for the communication session.

The standing row 204 includes a single user visual 602 for a participant 604 of the communication session. For instance, when the participant 604 joined the communication session, the participant 604 was detected as a single participant, e.g., by the face detection module 124. Thus, the layout module 122 was instructed to render a video feed for the participant 604 according to a single user scenario.

Further to the scenario 600, a participant 606 joins the participant 604 for the communication session. For instance, the participant 606 enters a room (e.g., a conference room, an office, and so forth) in which the participant 604 is situated and while the communication session is in progress. Accordingly, the face detection module 124 detects that an additional user is present in video feed that includes the participant 604, and generates a multiple user notification 608. In response to the multiple user notification 608, the layout module 122 populates a multiple user visual 610 that includes video images of the participants 604, 606 to the standing row 204. To make room for the multiple user visual 610, the layout module 122 demotes a least active participant from the standing row 204 to the sitting row 206. Thus, a user visual 612 for the least active participant is removed from the standing row 204, and a user visual 614 for the least active participant is populated to the sitting row 206.

Accordingly, the scenario 600 illustrates that changes in a number of users participating in a communication session at a particular location can cause a change in configuration of the client GUI 134, such as to accommodate additional users. While the scenario 600 is discussed with reference to detecting additional users, it is to be appreciated that similar logic may be applied to detect fewer users. For instance, consider the scenario 600 in reverse such that the participant 606 leaves a location at which the user 604 is participating the communication session. In such a scenario the face detection module 124 detects that a number of participants at the location is reduced, and sends a notification to the layout module 122 indicating that a number of participants at the location has changed, e.g., is reduced to one participant. Accordingly, the layout module 122 reconfigures the user representation for the participant 604 to the single user visual 602 that includes the user 604. Further, a most active participant from the sitting row 206 is promoted to the standing row.

Figure 7:
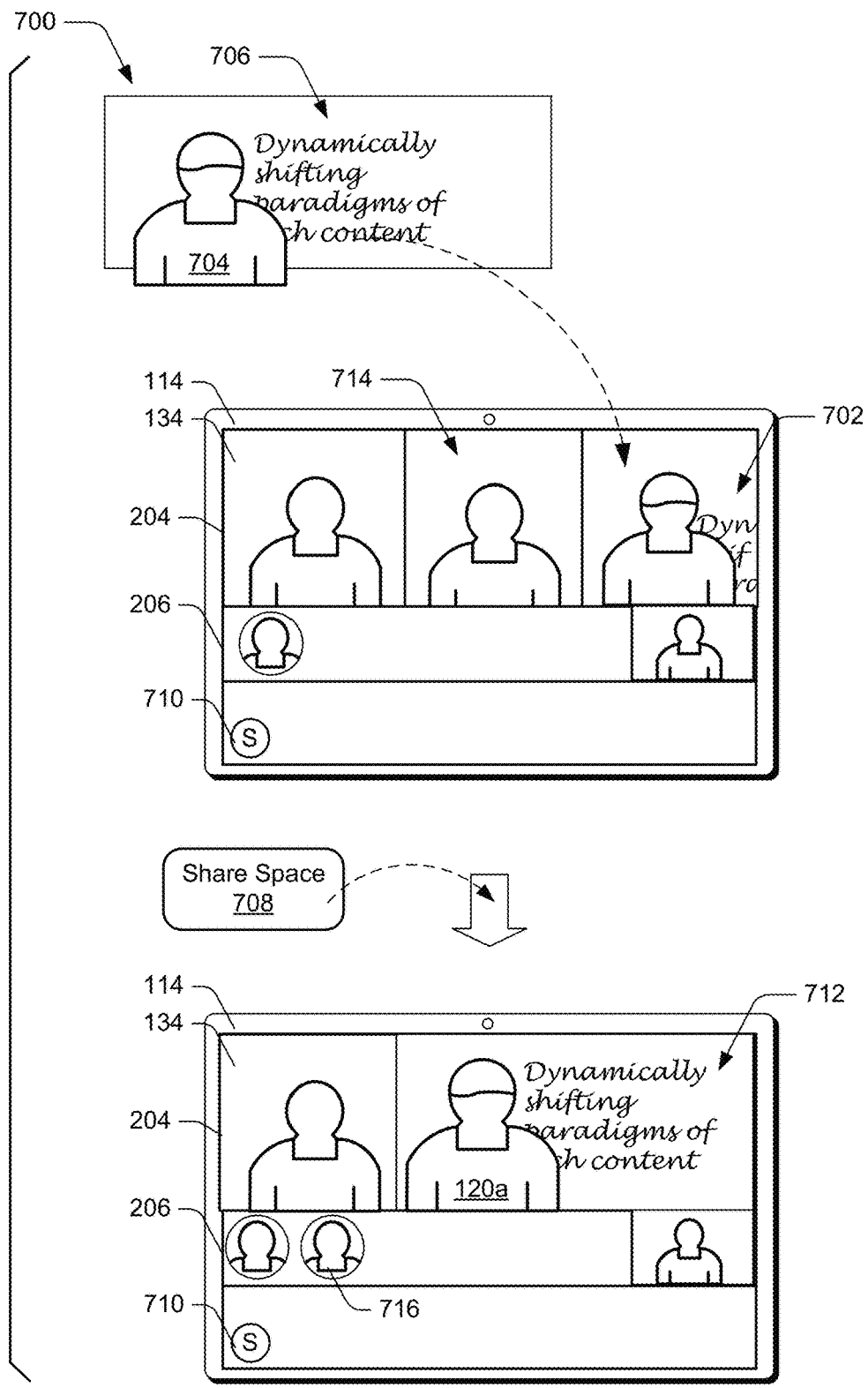
FIG. 7 depicts an example implementation scenario for arranging a client GUI for a communication session for sharing content in accordance with one or more embodiments.

FIG. 7 depicts an example implementation scenario 700 for arranging a client GUI for a communication session for sharing content in accordance with one or more implementations. The scenario 700 includes various entities and components introduced above with reference to the environment 100, and in at least some implementations represents an extension and/or variation of one or more of the scenarios 200-600 described above.

The upper portion of the scenario 700 includes the client GUI 134 displayed on the display device 114 and with the standing row 204 and the sitting row 206 populated with user visuals for users participating in a communication session. Generally, the standing row 204 and the sitting row 206 are populated based on various parameters, such as participant join order and/or activity level for the communication session. The sitting row 206 includes a single user visual 702 for a participant 704 in the communication session.

Further to the scenario 700, the participant 704 has content 706 to share as part of the communication session. The content 706, for instance, represents content that is physically present at the participant 704's location, such as content on a whiteboard and/or other physical medium. Alternatively or additionally, the content 706 represents digital content that the participant 704 wishes to share, such as content on a desktop user interface of the participant 704, an electronic content file stored in a file storage location, and so forth.

Accordingly, and proceeding to the lower portion of the scenario 700, the participant 704 generates a share space request 708 requesting additional display space within the client GUI 134 to enable the content 706 to be shared with other participants in the communication session. For instance, the participant 704 selects a share control 710 at their respective instance of the client GUI 134. In response to the share space request 708, the participant 704 is provided with a share frame 712 within the standing row 204. For instance, the single user visual 702 is expanded to the share frame 712. Thus, the content 706 is viewable within the share frame 712. The participant 706 may interact with the content 706, and such interaction is viewable in the share frame 712 by other participants in the communication session.

To provide space for the share frame 712, a least active participant from the standing row 204 is demoted to the sitting row 206. For instance, a user visual 714 in the standing row 204 for the least active participant is removed, and a user visual 716 for the least active participant is populated to the sitting row 206.

According to one or more implementations, when the participant 704 is finished sharing the content 706, the participant 704 may indicate that the participant 704 is finished sharing. For instance, the participant 704 may again select the sharing control 710. In response, the sharing frame 712 is removed and the participant is represented via the single user visual 702. For instance, returning to the upper portion of the scenario 700, the participant 704 is represented via the single user visual 702 in the standing row 204. Further, a most active participant from the sitting row 206 is promoted to the standing row.

Thus, the scenario 700 illustrates that a sharing space can be allotted to enable a user to share content during a communication session. Further, allotting the sharing space includes reconfiguring the client GUI 134 based on user activity for participants involved in the communication session.

Figure 8:
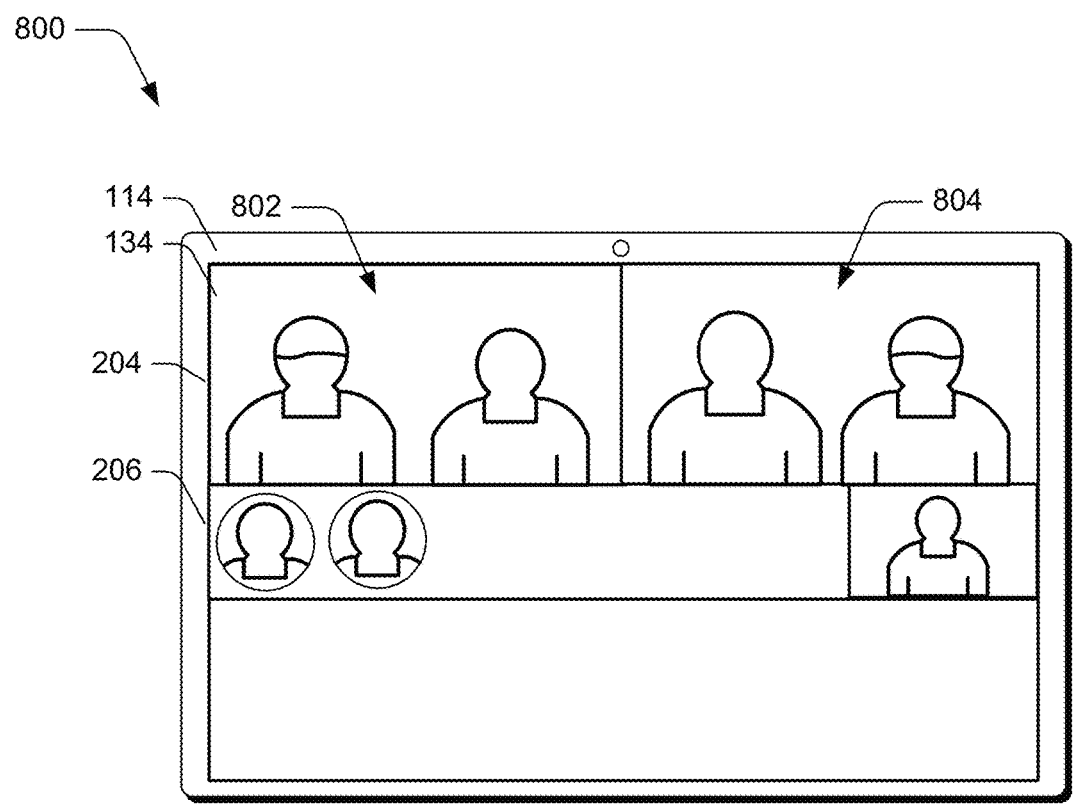
FIG. 8 depicts an example arrangement of a client GUI in accordance with one or more embodiments.

FIG. 8 depicts an example arrangement of the client GUI 134 displayed on the display device 114, including the standing row 204 and the sitting row 206. In this particular example, the standing row 204 is populated with two multiple user visuals, i.e., a multiple user visual 802 and a multiple user visual 804. Generally, the multiple user visuals 802, 804 are generated using video feeds captured at locations at which participants represented in the multiple user visuals 802, 804 are located. For instance, participants depicted within both of the multiple user visuals 802, 804 are determined to be the most active participants in a communication session. Thus, video feeds that include the participants are visually sized within the client GUI 134 to enable the multiple user visuals 802, 804 to be presented together. Further, the sitting row 206 is populated with user visuals for other participants in the communication session, e.g., for participants that are determined to be less active than those depicted in the multiple user visuals 802, 804.

Figure 9:
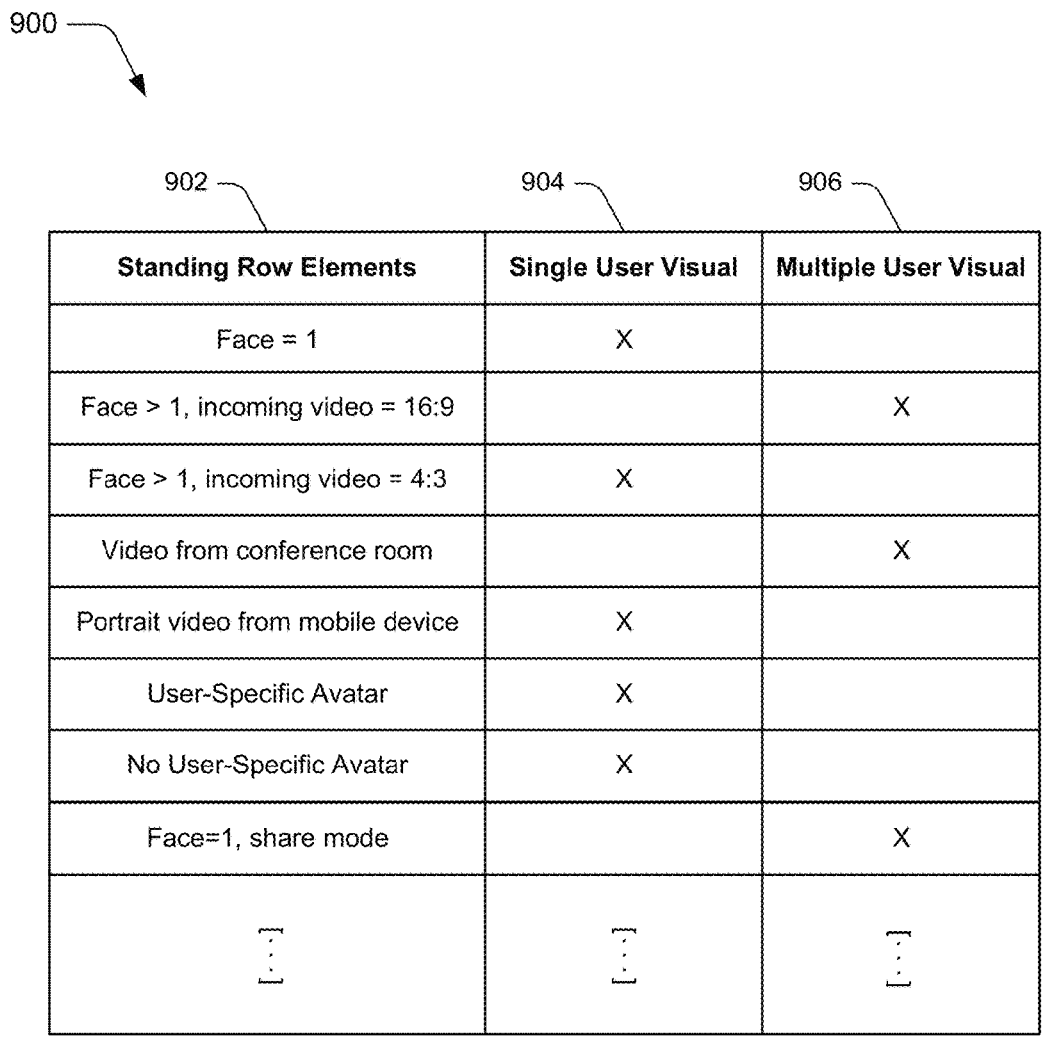
FIG. 9 depicts an example standing row table in accordance with one or more embodiments.

FIG. 9 depicts an example standing row table 900 in accordance with one or more implementations. Generally, the standing row table 902 specifies configurations for different user visuals to be applied during a communication session. The standing row table 904 includes an elements column 902, a single user visual column 904, and a multiple user visual column 906. Generally, the elements column 902 identifies different possible elements received in an incoming media stream during a communication session. The single user visual column 904 corresponds to a visual size (e.g., aspect ratio) for a single user visual. For instance, the single user visual column 904 corresponds to a 1:1 aspect ratio. The multiple user visual column corresponds to a visual size for a multiple user visual. For instance, the multiple user visual column 906 corresponds to a 16:9 aspect ratio.

The standing row table 900 specifies that if a single face is detected in a video stream, a single user visual is to be used to present the video stream in a standing row. If more than one face is detected in a video stream and the video stream has a wide aspect ratio (e.g., 16:9), a multiple user visual is to be used to present the video stream in a standing row. If more than one face is detected in a video stream and the video stream has a narrow aspect ratio (e.g., 14:9), a single user visual is to be used to present the video stream in a standing row. If a video stream is received from a conference room or other multi-user space, the video stream is to be presented in a multiple user visual.

If the video stream is generated in a portrait mode at a mobile device (e.g., a tablet, a mobile phone, and so forth), the video stream is to be presented in a single user visual. If a standing row participant is represented via a user-specific avatar (e.g., a still image instead of a live vide stream), the standing row participant is to be represented by populating the user-specific avatar to a single user visual. If there is no user-specific avatar or video feed for a standing row participant, the participant is to be represented via a placeholder single user visual. If a single face is detected in a video stream and a share mode is active (e.g., in response to a share request from a participant), a multiple user visual is to be used to present the video stream in a standing row.

Thus, the standing row table 900 specifies different logic for representing different configurations of participants in a communication session. These particular element configurations and visual representations are presented for purpose of example only, and it is to be appreciated that a wide variety of different elements and visual representations may be employed in accordance with techniques described herein.

Having discussed some example implementation scenarios, consider now a discussion of some example procedures in accordance with one or more embodiments.

Example Procedures for Visual Configuration

The following discussion describes some example procedures for visual configuration for communication session participants in accordance with one or more embodiments. The example procedures may be employed in the environment 100 of FIG. 1, the system 2000 of FIG. 20, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., by a communication client 110 at a client device 102) and/or at a network-based service, such as the communication service 118.

Figure 10:
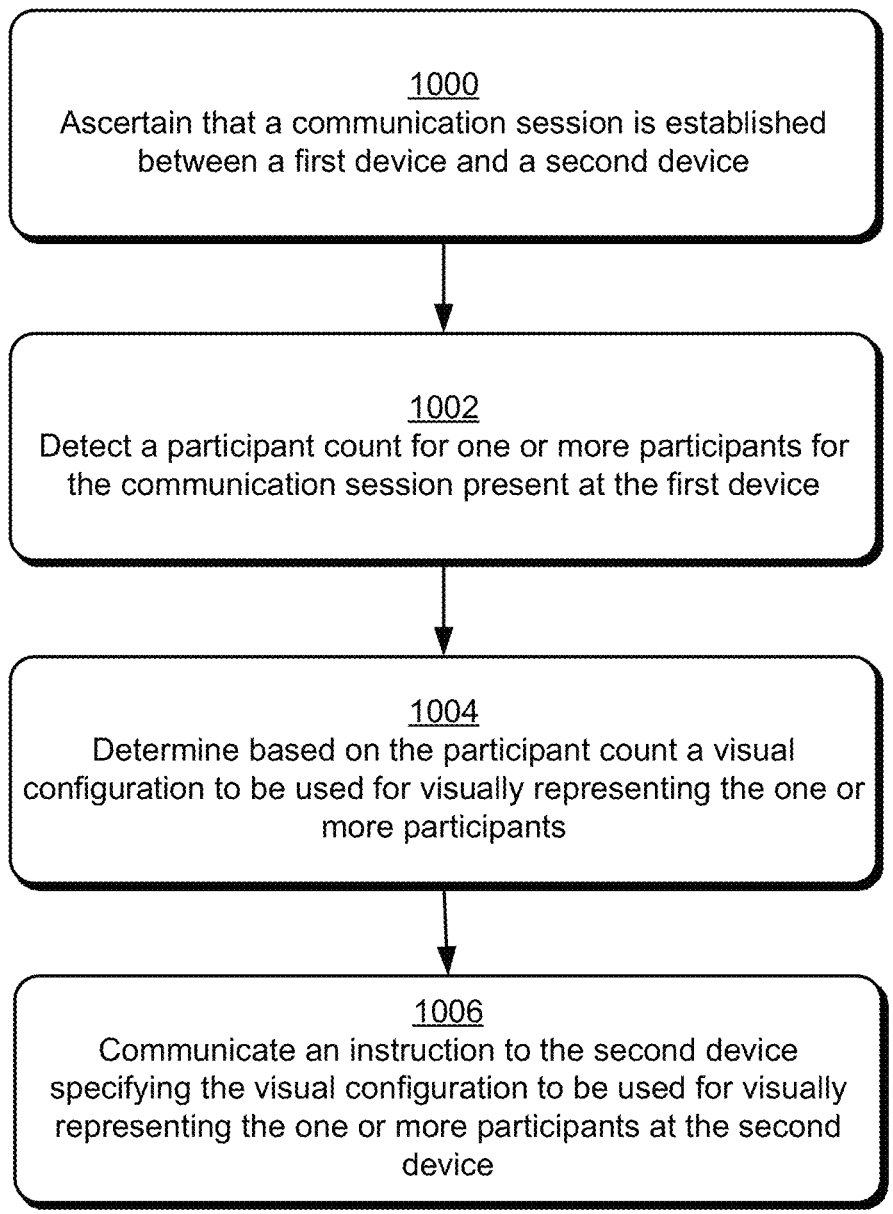
FIG. 10 is a flow diagram that describes steps in a method for specifying a visual configuration for one or more participants in a communication session accordance with one or more embodiments.

FIG. 10 is a flow diagram that describes steps in a method in accordance with one or more implementations. The method describes an example procedure for specifying a visual configuration for one or more participants in a communication session in accordance with one or more implementations.

Step 1000 ascertains that a communication session is established between a first device and a second device. A communication client 110, for instance, initiates a communication session with another communication client 110, or joins an existing communication session. Further, the client GUI module 120 generates a client GUI for the communication session.

Step 1002 detects a participant count for one or more participants for the communication session present at the first device. The participant count, for instance, is detected via video data captured at the first device, such as from a video feed captured by the camera 116 at the first device. In at least some implementations, the face detection module 124 determines the participant count by ascertaining a number of different faces detected via facial recognition processing of the video data.

Step 1004 determines based on the participant count a visual configuration to be used for visually representing the one or more participants. The face detection module 124, for instance, communicates the participant count to the layout module 122. Based on the participant count, the layout module 122 determines the visual configuration. For example, if the participant count=1, the visual configuration is determined as a single user visual for representing the single participant. If the participant count>1, the visual configuration is determined as a multiple user visual for representing the multiple participants.

Step 1006 communicates an instruction to the second device specifying the visual configuration to be used for visually representing the one or more participants at the second device. A communication client 110 at the first device, for instance, communicates the instruction to a communication client 110 at the second device. Thus, the communication client 110 at the second device may utilize the instruction to cause a visual representation of the one or more participants to be displayed at the second device based at least in part on the visual configuration specified in the instruction.

Figure 11:
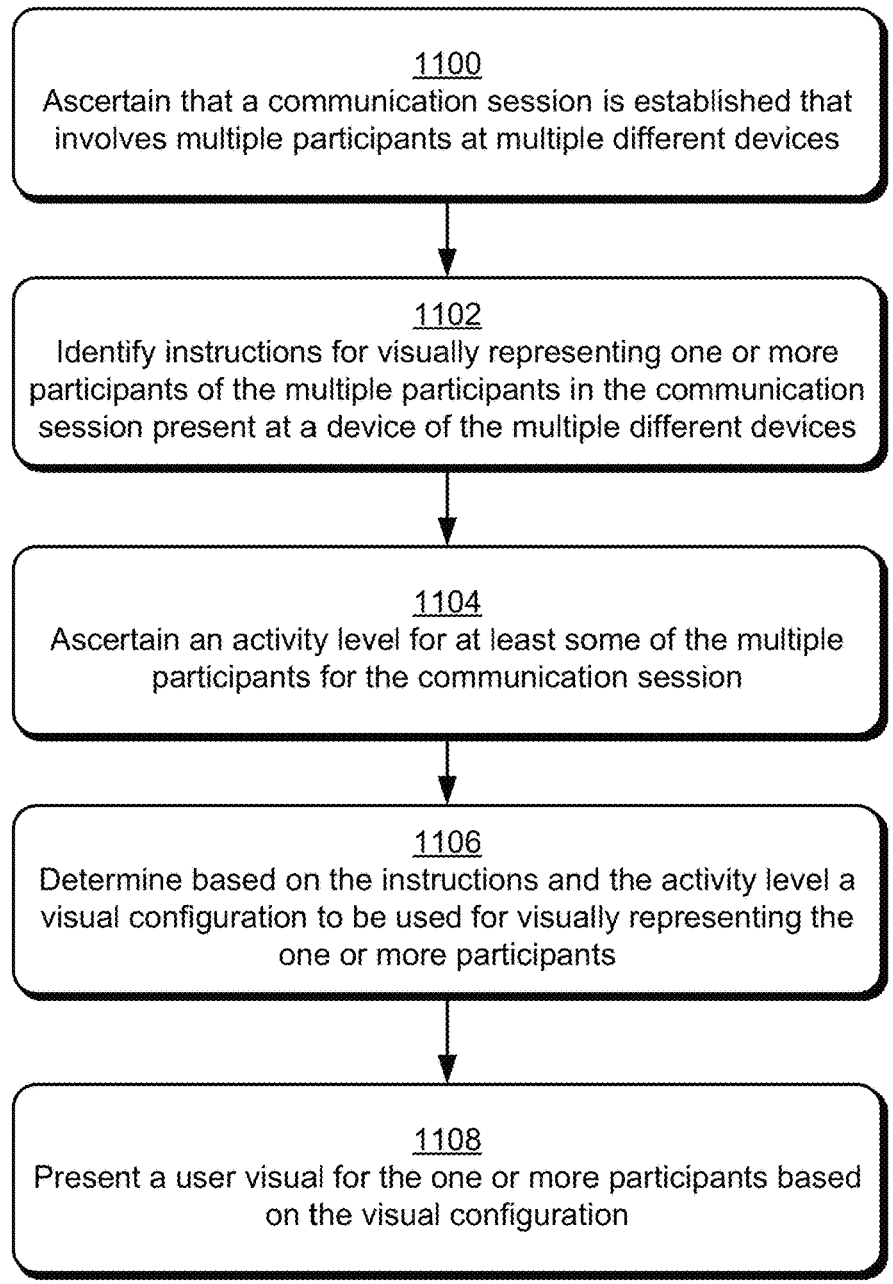
FIG. 11 is a flow diagram that describes steps in a method for presenting a user visual for one or more participants in a communication session accordance with one or more embodiments.

FIG. 11 is a flow diagram that describes steps in a method in accordance with one or more implementations. The method describes an example procedure for presenting a user visual for one or more participants in a communication session in accordance with one or more implementations.

Step 1100 ascertains that a communication session is established that involves multiple participants at multiple different devices. A communication client 110 at a first device, for instance, initiates a communication session with another communication client 110 at a second device, or joins an existing communication session.

Step 1102 identifies instructions for visually representing one or more participants of the multiple participants in the communication session present at a device of the multiple different devices. A communication client 110 at a first device, for instance, receives the instructions from a second device. Generally, the instructions specify a visual configuration to be used to visually represent the one or more participants. The instructions, for example, specify a relative size for a visual for the one or more participants, such as whether the one or more participants are to be displayed via a single user visual, a multiple user visual, and so forth.

Step 1104 ascertains an activity level for at least some of the multiple participants for the communication session. The activity detection module 126, for instance, detects a relative level of activity for participants in the communication session. In at least some implementations, the activity is detected based on voice data detected in media streams from client devices for the different participants. Generally, participants are categorized into more active ("active") participants, and less active ("passive") participants. An example way for detecting and characterizing activity levels is detailed below.

Step 1106 determines based on the instructions and the activity level a visual configuration to be used for visually representing the one or more participants. A layout module 122 at a first client device, for instance, utilizes the instructions and the detected activity level to determine a visual configuration for representing one or more participants that are present at a second device involved in the communication session. An example way of determining a visual configuration for participants in a communication session is detailed below.

Step 1108 presents a user visual for the one or more participants based on the visual configuration. The layout module 122, for example, communicates the visual configuration information to the client GUI module 120. Generally, the visual configuration information specifies a size of a visual to be used for representing the one or more participants, and whether the one or more participants are to be visually represented as active participants or passive participants. The client GUI module 120 utilizes the visual configuration information to populate a user visual for the one or more participants to the client GUI 134. Example ways of displaying user visuals based on different participant scenarios are detailed throughout this disclosure.

Figure 12:
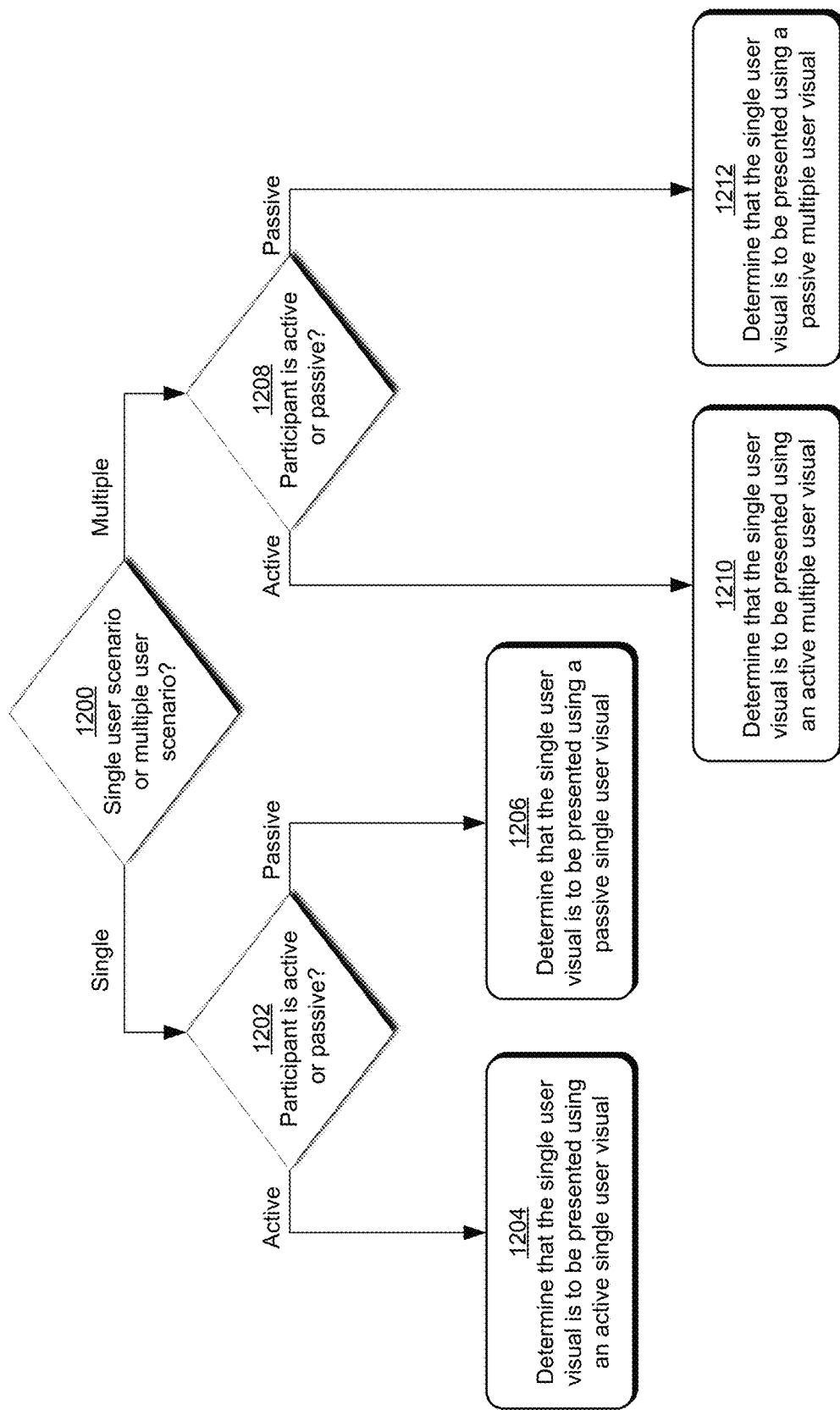
FIG. 12 is a flow diagram that describes steps in a method for determining a visual configuration for one or more participants in a communication session accordance with one or more embodiments.

FIG. 12 is a flow diagram that describes steps in a method in accordance with one or more implementations. The method describes an example procedure for determining a visual configuration for one or more participants in a communication session in accordance with one or more implementations. The method, for instance, describes an example procedure for performing step 1106 of the procedure described above with reference to FIG. 11.

Step 1200 ascertains whether a user visual for one or more participants is to be presented according to a single user visual or a multiple user visual. A layout module 122 at a first device, for instance, determines based on instructions received from a second device whether a user visual for a video feed from the second device is to be presented at the first device according to a single user scenario or a multiple user scenario.

If the user visual is to be presented according to a single user visual ("Single"), step 1202 determines whether a participant for the single user visual is active or passive. One example way of determining whether a participant is active or passive is detailed below. If the participant is active ("Active"), step 1204 determines that the single user visual is to be presented using an active single user visual. The single user visual, for instance, is presented as part of an active visual region of the client GUI 134, such as in the standing row 204.

If the participant is passive ("Passive"), step 1206 determines that the single user visual is to be presented as a passive single user visual. For example, the single user visual is presented in a passive user region of the client GUI 134, such as the sitting row 206.

Returning to step 1200, if the user visual is to be presented according to a multiple user visual ("Multiple"), step 1208 determines whether a participant for the multiple user visual is active or passive. If the participant is active ("Active"), step 1210 determines that the multiple user visual is to be presented using an active multiple user visual. The multiple user visual, for instance, is presented as part of an active visual region of the client GUI 134, such as in the standing row 204.

If the participant is passive ("Passive"), step 1212 determines that the multiple user visual is to be presented as a passive multiple user visual. For example, the multiple user visual is presented in a passive user region of the client GUI 134, such as the sitting row 206.

Figure 13:
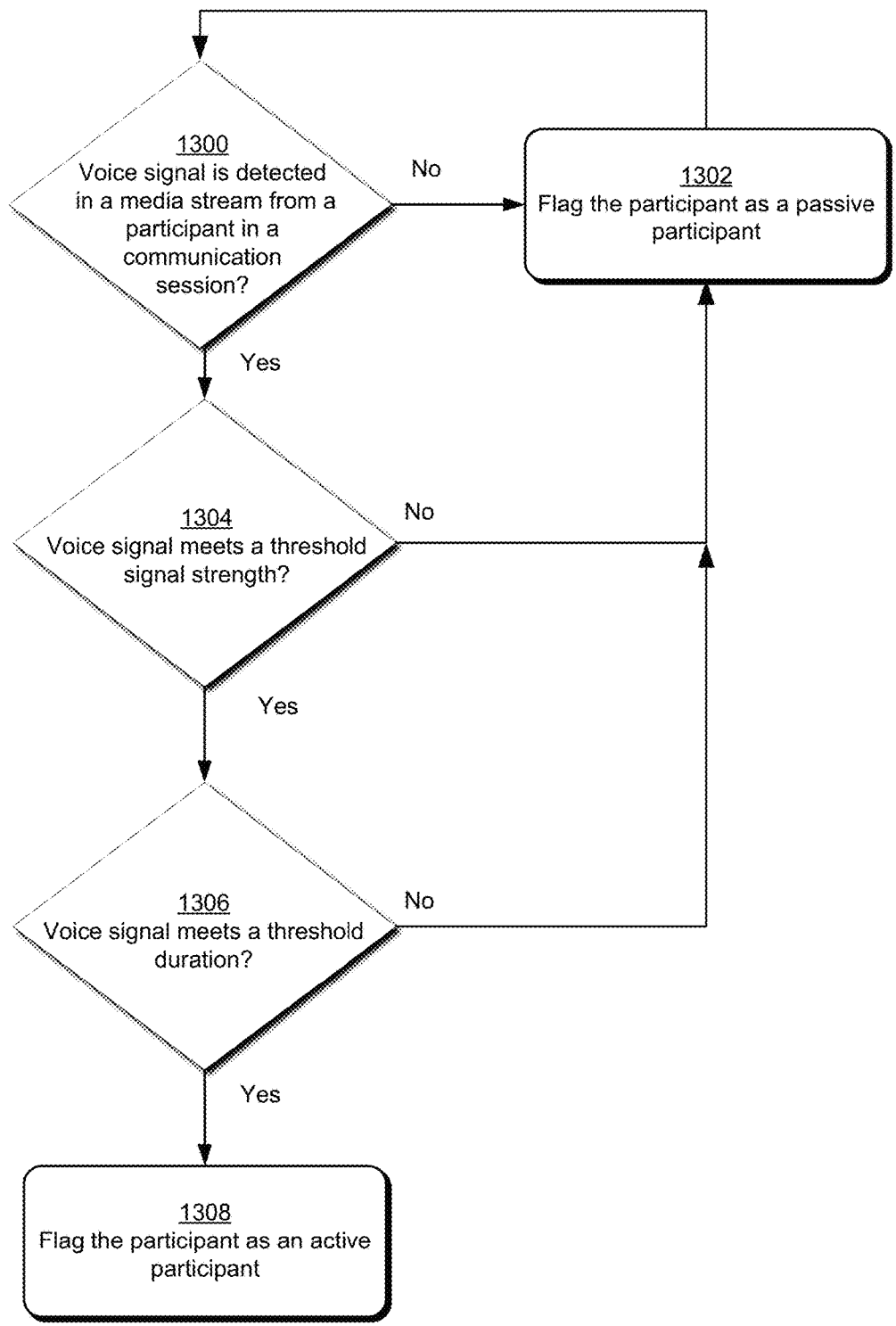
FIG. 13 is a flow diagram that describes steps in a method for ascertaining activity for a participant in a communication session accordance with one or more embodiments.

FIG. 13 is a flow diagram that describes steps in a method in accordance with one or more implementations. The method describes an example procedure for ascertaining activity for a participant in a communication session in accordance with one or more implementations. The method, for instance, describes an example procedure for performing step 1104 of the procedure described above with reference to FIG. 11.

Step 1300 ascertains whether voice signal is detected in a media stream from a participant in a communication session. Generally, the media stream is part of a communication session, such as part of a media stream that includes video data and audio data captured at a client device. For instance, the activity detection module 126 for a client device involved in the communication session ascertains whether voice signal is detected in a media stream received from another client device involved in the communication session.

If voice signal is not detected in the media stream ("No"), step 1302 flags the participant as a passive participant. The activity detection module 126, for instance, updates the activity log 130 to indicate that the participant is a passive participant.

If voice signal is detected in the media stream ("Yes"), step 1304 ascertains whether the voice signal meets a threshold signal strength. For instance, the activity detection module 126 compares the voice signal to a threshold signal strength. The threshold signal strength may be specified in various ways, such as a threshold volume level, a threshold minimum signal-to-strength value, and so forth.

If the voice signal does not meet the threshold signal strength ("No"), the process returns to step 1302 and the participant is flagged as a passive participant.

If the voice signal meets the threshold signal strength ("Yes"), step 1306 ascertains whether the voice signal meets a threshold duration. The threshold duration may be specified in various ways, such as in milliseconds, seconds, and so forth. If the voice signal does not meet the threshold duration ("No"), the process returns to step 1306 and the participant is flagged as a passive participant.

If the voice signal meets the threshold duration ("Yes"), step 1310 flags the participant as an active participant. The activity detection module 126, for instance, updates the activity log 130 to categorize the participant as an active participant.

The procedure may be performed continuously and/or periodically during a communication session to ascertain whether a participant is active or passive. For instance, if a participant is flagged as a passive participant, a media stream from the participant is continuously monitored for voice data. Thus, if the participant subsequently begins speaking during the communication session such that voice data is detected that meets the specified thresholds, the participant may be reflagged as an active participant. Further, if an active participant ceases speaking during the communication session, the active participant may be flagged as a least active participant and/or reflagged as a passive participant.

Figure 14:
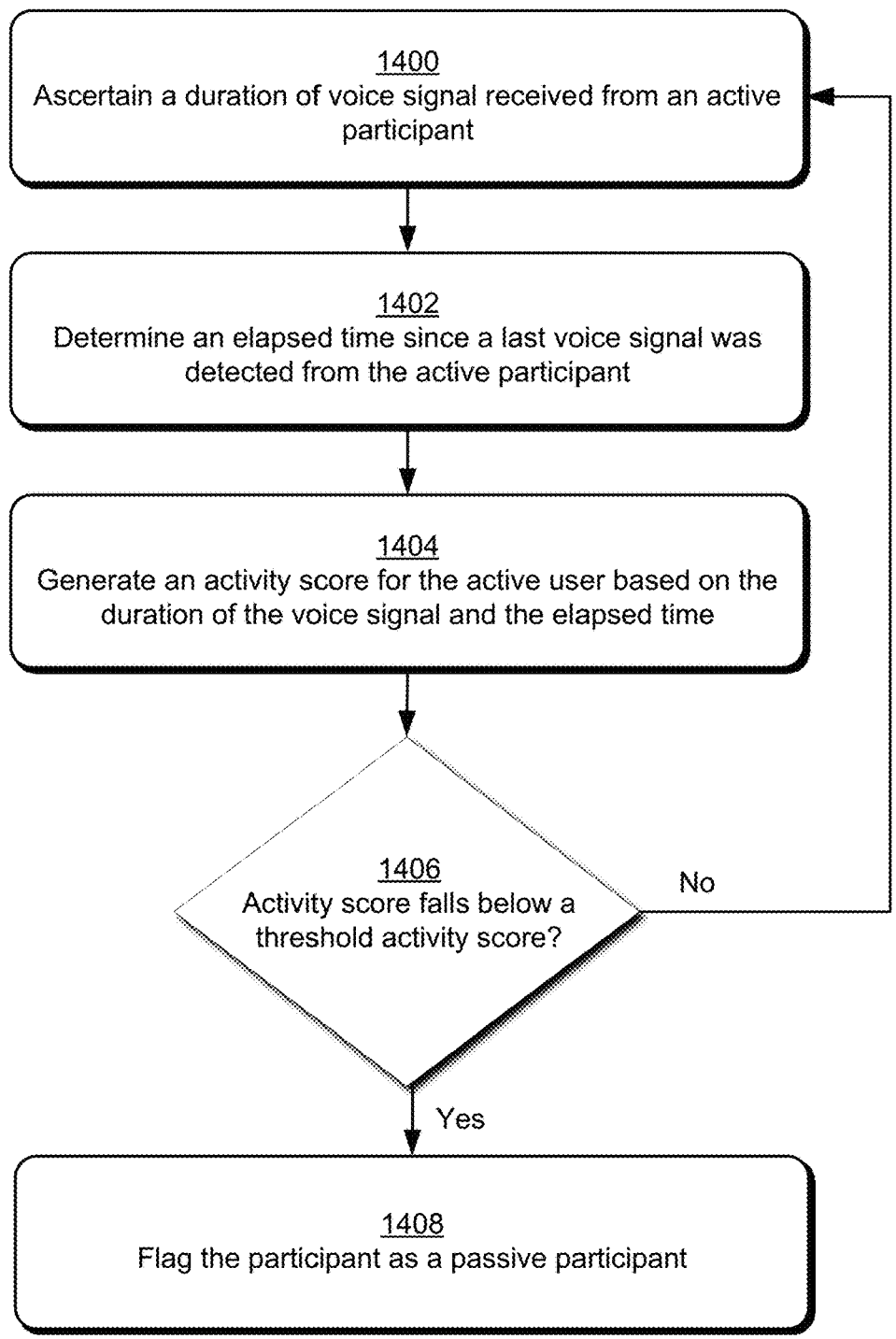
FIG. 14 is a flow diagram that describes steps in a method for ascertaining an activity level for an active participant in a communication session in accordance with one or more embodiments.

FIG. 14 is a flow diagram that describes steps in a method in accordance with one or more implementations. The method describes an example procedure for ascertaining an activity level for an active participant in a communication session in accordance with one or more implementations.

Step 1400 ascertains a duration of voice signal received from an active participant. The duration, for instance, may be determined based on a single voice event, such as a duration of a single uninterrupted stream of voice signal received from the active participant. Alternatively or additionally, the duration may be determined based on multiple different discrete voice events from the participant over a specified period of time.

Step 1402 determines an elapsed time since a last voice signal was detected from the active participant. The last voice signal, for instance, corresponds to a voice signal from the active participant that meets a threshold signal strength and/or a threshold duration. The elapsed time may be specified in various ways, such in milliseconds, seconds, minutes, and so forth.

Step 1404 generates an activity score for the active user based on the duration of the voice signal and the elapsed time. For example, when a participant is flagged as an active participant such as described above, the participant is given a default activity score. The activity score for the participant is then adjustable based on whether the participant is more or less active. For instance, the activity score is increased in response to detecting longer duration of voice signal from the participant and/or in response to a shorter elapsed time since a most recent voice signal from the participant. Conversely, the activity score is decreased in response to detecting shorter duration of voice signal from the participant and/or in response to a longer elapsed time since a most recent voice signal from the participant. Thus, a participant that contributes longer durations of voice input and more frequent voice input to a communication session has a higher activity score than a participant that contributes shorter durations of voice input and less frequent voice input to the communication session. In at least some implementations, an active participant with a lower activity score than a different active participant is considered a less active participant than the different active participant.

Step 1406 ascertains whether the activity score falls below a threshold activity score. If the activity score falls below a threshold activity score ("Yes"), step 1408 flags the participant as a passive participant. The activity detection module 126, for instance, updates the activity log 130 to indicate that the participant is a passive participant. In at least some implementations, flagging the participant as a passive participant causes a visual representation of the participant to be transitioned (e.g., demoted) from an active region of the client GUI 134 (e.g., the standing row 204) to a passive region of the client GUI 134, e.g., the sitting row 206.

If the activity score does not fall below the threshold activity score ("No"), the procedure returns to step 1400. For instance, an activity score for an active participant may be continuously and/or periodically adjusted to account for changes in activity for the participant. Thus, techniques described herein can be employed to dynamically evaluate activity levels during a communication session to ascertain whether a participant is active or passive, such as described above with reference to FIG. 13. Further, an active participant may be dynamically evaluated to identify more active and less active participants, and to reflag an active participant as a passive participant if the participant's activity level falls below a threshold.

Having discussed some example implementation scenarios and procedures for visual configuration for communication session participants, consider now a discussion of some example implementation scenarios and procedures for presenting a message in a communication session in accordance with one or more implementations.

Example Implementation Scenarios for Message Presentation

The following section describes some example implementation scenarios for presenting a message in a communication session in accordance with one or more implementations. The implementation scenarios may be implemented in the environment 100 discussed above, and/or any other suitable environment.

Figure 15:
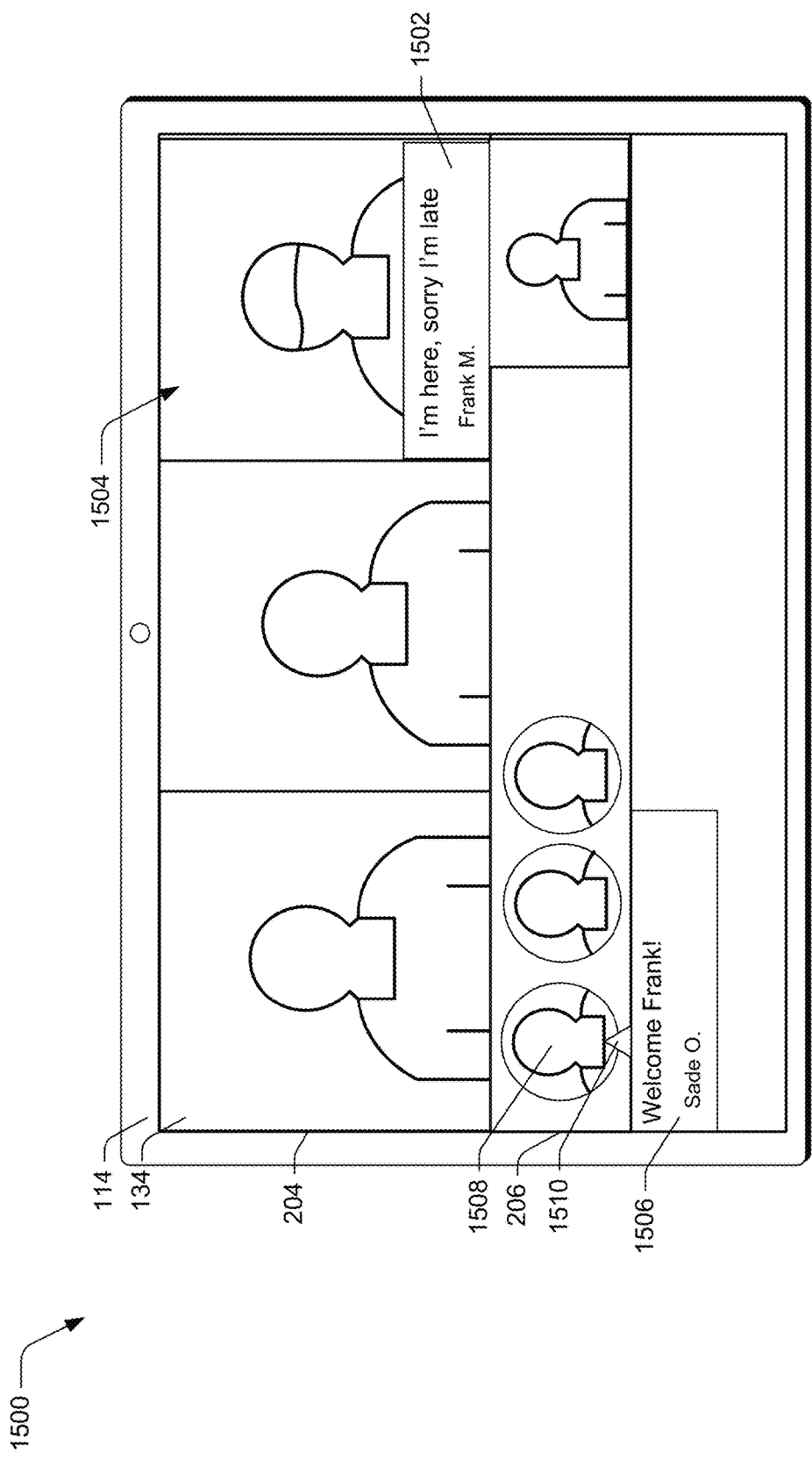
FIG. 15 depicts an example implementation scenario for presenting messages during a communication session in accordance with one or more embodiments.

FIG. 15 depicts an example implementation scenario 1500 for presenting messages during a communication session in accordance with one or more implementations. The scenario 1500 includes various entities and components introduced above with reference to the environment 100, and in at least some implementations represents an extension and/or variation of one or more of the scenarios described above.

The scenario 1500 includes the client GUI 134 displayed on the display device 114 and with the standing row 204 and the sitting row 206 populated with user visuals for users participating in a communication session. Further to the scenario 1500, participants in the communication session send messages as part of the communication session. Accordingly, a message 1502 is displayed overlaid on a user visual 1504 of the standing row 204. The message 1502 is generated via input from a participant represented by the user visual 1504. As illustrated, the message 1502 includes message content (text in this example) and identifies a participant represented by the user visual 1504 that sent the message, i.e., "Frank M." Thus, the message 1502 is visually identified with a participant that sends the message, and is presented in-line with a user visual for the participant.

Further depicted is a message 1506 that is sent by a participant represented by a user visual 1508 in the sitting row 206. The message 1506, for instance, is sent by a passive participant represented by the user visual 1508. The message 1506 includes message content (text in this example) and identifies a user that sent the message, i.e., "Sade O." As illustrated, the message 1506 is visually tied to the user visual 1508, e.g., via a visual pointer 1510 that visually links the message 1506 to the user visual 1508.

According to various implementations, the messages 1502, 1506 are presented in real-time as the messages are generated by the respective participants while the communication session is in progress. Accordingly, techniques for presenting a message in a communication session described herein enable messages to be presented during a communication session in a manner that enables the messages to be easily viewed and attributed to a sending user. Further, messages are presented without requiring participants to remove their focus from user visuals during the communication session and without requiring participants in the communication session to navigate to a separate window to view the messages.

In at least some implementations, the messages 1502, 1506 are selectable to view additional messages, such as a message history for a sending participant and/or a message window that includes a chronological list of messages sent during the communication session.

Figure 16:
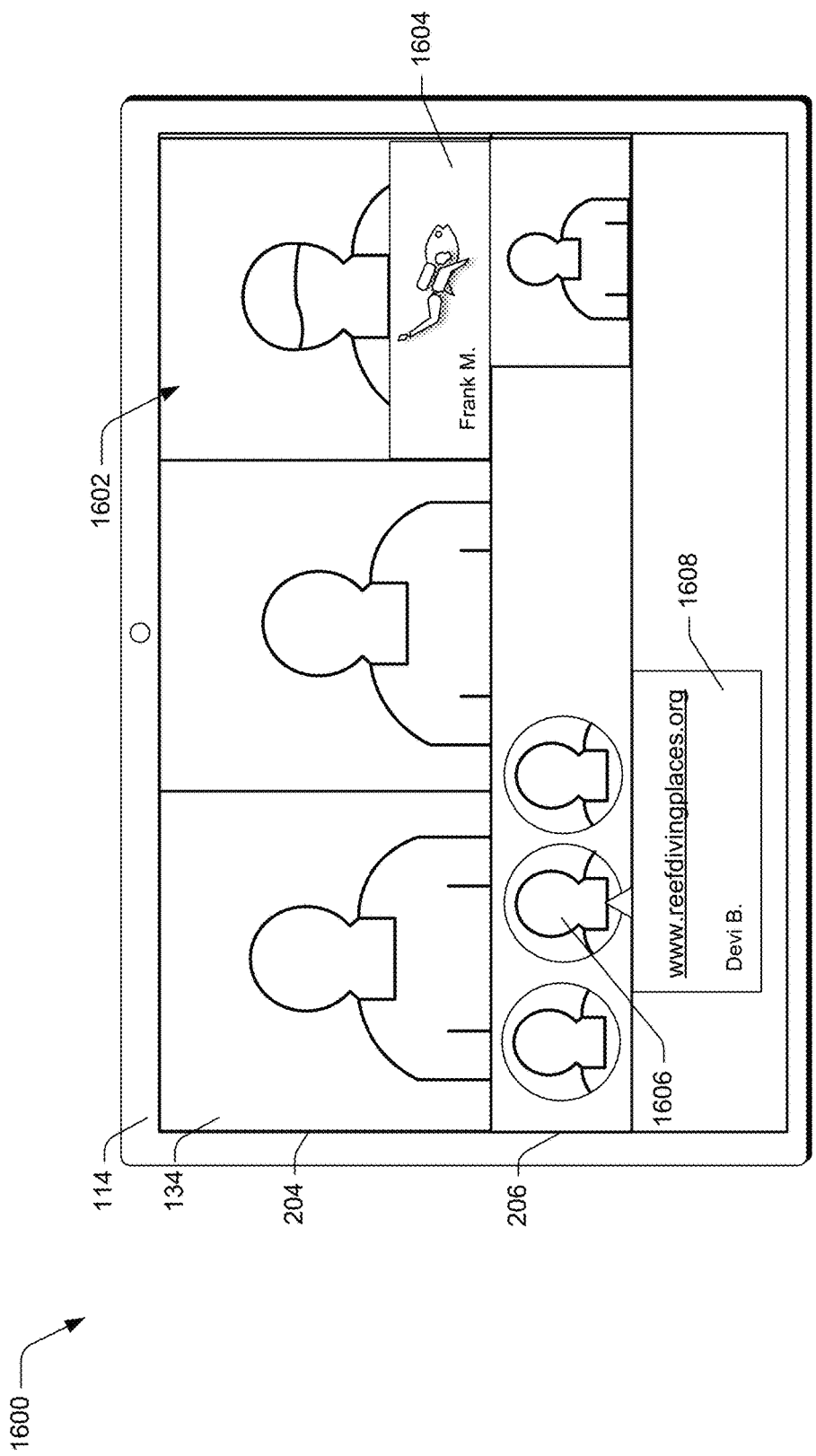
FIG. 16 depicts an example implementation scenario for presenting multimedia notifications during a communication session in accordance with one or more embodiments.

FIG. 16 depicts an example implementation scenario 1600 for presenting multimedia notifications during a communication session in accordance with one or more implementations. The scenario 1600 includes various entities and components introduced above with reference to the environment 100, and in at least some implementations represents an extension and/or variation of one or more of the scenarios described above.

The scenario 1600 includes the client GUI 134 displayed on the display device 114 and with the standing row 204 and the sitting row 206 populated with user visuals for users participating in a communication session. Further to the scenario 1600, participants in the communication session send messages as part the communication session. For instance, a participant "Frank M." represented by the user visual 1602 sends a message 1604 which in this case includes an image. According to various implementations, the message 1604 is selectable to view a larger version of the image and/or to retrieve a copy of the image.

Further to the scenario 1600, a participant "Devi B." represented by a visual 1606 sends a message 1608 that includes a hyperlink. The hyperlink, for instance, is selectable to navigate to a network resource associated with the hyperlink, such as a website.

Thus, the scenario 1600 illustrates that techniques for presenting a message in a communication session can be employed to present messages with a wide variety of different types of content, and that the messages are interactive to enable various actions to be performed in response to user interaction with the messages.

Figure 17:
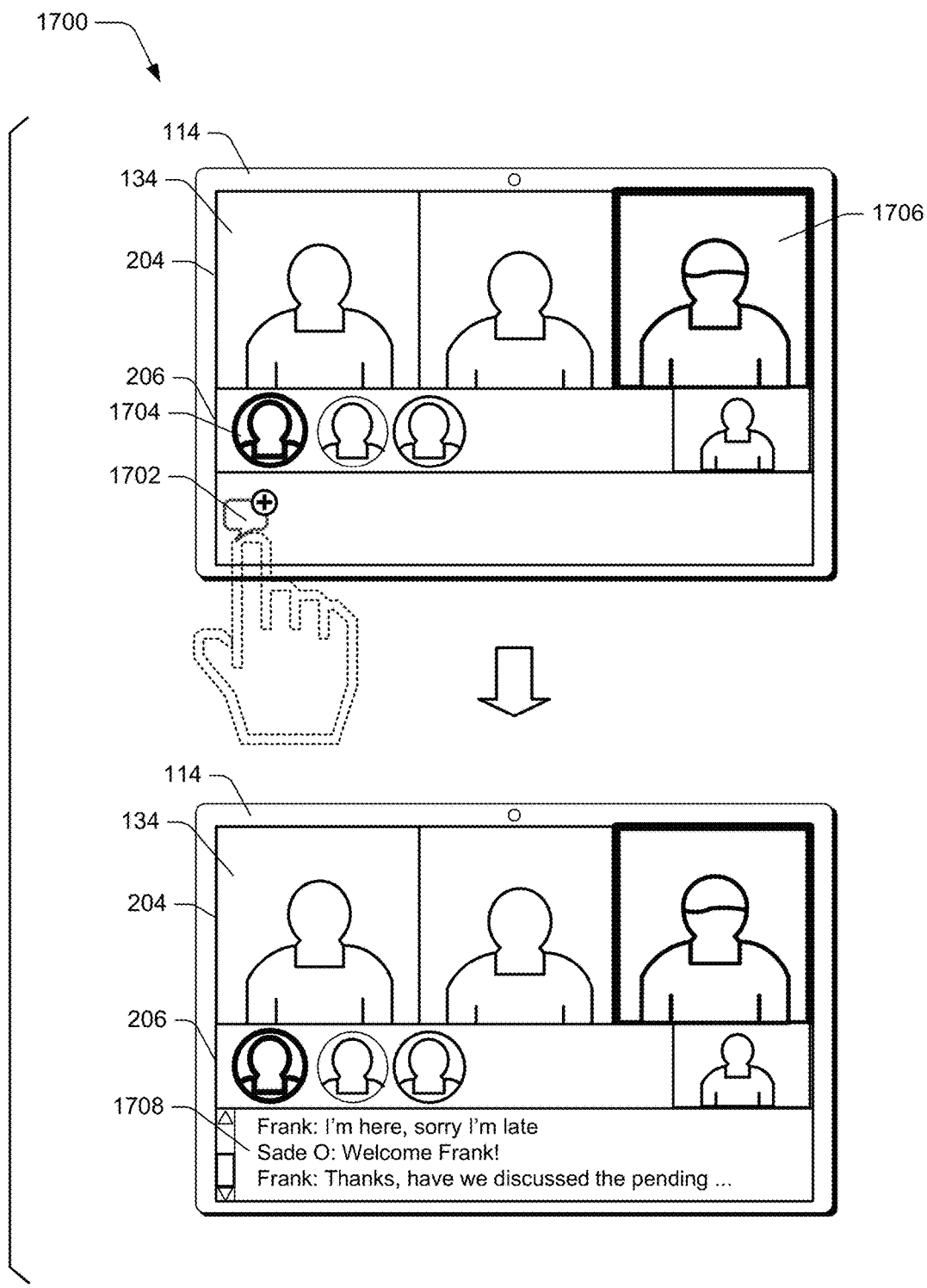
FIG. 17 depicts an example implementation scenario for presenting a notification of multiple messages in accordance with one or more embodiments.

FIG. 17 depicts an example implementation scenario 1700 for presenting a notification of multiple messages in accordance with one or more implementations. The scenario 1700 includes various entities and components introduced above with reference to the environment 100, and in at least some implementations represents an extension and/or variation of one or more of the scenarios described above.

The upper portion of the scenario 1700 includes the client GUI 134 displayed on the display device 114 and with the standing row 204 and the sitting row 206 populated with user visuals for users participating in a communication session. Further to the scenario 1700, participants in the communication session send messages as part the communication session. The messaging module 128, however, detects that many messages are sent over a short period of time. For instance, the messaging module detects that a threshold number of messages is exceeded for a particular pre-specified display period. Thus, instead of visually presenting each of the messages separately as depicted in the scenarios 1500, 1600, the messaging module 128 presents a message notification 1702 that provides a visual indication that multiple messages have been sent are available to be viewed.

Further depicted in the upper portion of the scenario 1700 are highlighted user visuals 1704, 1706. The user visuals 1704, 1706 are highlighted to indicate that participants represented by the highlighted visuals are sending messages represented by the message notification 1702. Thus, participants viewing the client GUI 134 can ascertain that multiple messages are available to be viewed, and that participants represented by the user visuals 1704, 1706 are sending at least some of the messages.

Proceeding to the lower portion of the scenario 1700, a user selects the message notification 1702, which causes a message window 1708 to be presented. Generally, the message window 1708 is populated with multiple messages that were sent to cause the message notification 1702 to be presented. Accordingly, participants in the communication session can view the messages via the message window 1708, and may enter messages into the message window 1708. While the message window 1708 is depicted as including text-based messages, it is to be appreciated that messages with a wide variety of other types of media may be populated to the message window 1708, such as images, video, audio, content files, and so forth.

Thus, the scenario 1700 illustrates that techniques for presenting a message in a communication session can be employed to throttle (e.g., limit) the number of messages that are presented in-line with user visuals during a communication session, thus preventing the client GUI 134 from being visually overwhelmed during an active messaging scenario.

Example Procedures for Message Presentation

The following discussion describes some example procedures presenting a message in a communication session in accordance with one or more embodiments. The example procedures may be employed in the environment 100 of FIG. 1, the system 2000 of FIG. 20, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., by a communication client 110 at a client device 102) and/or at a network-based service, such as the communication service 118.

Figure 18:
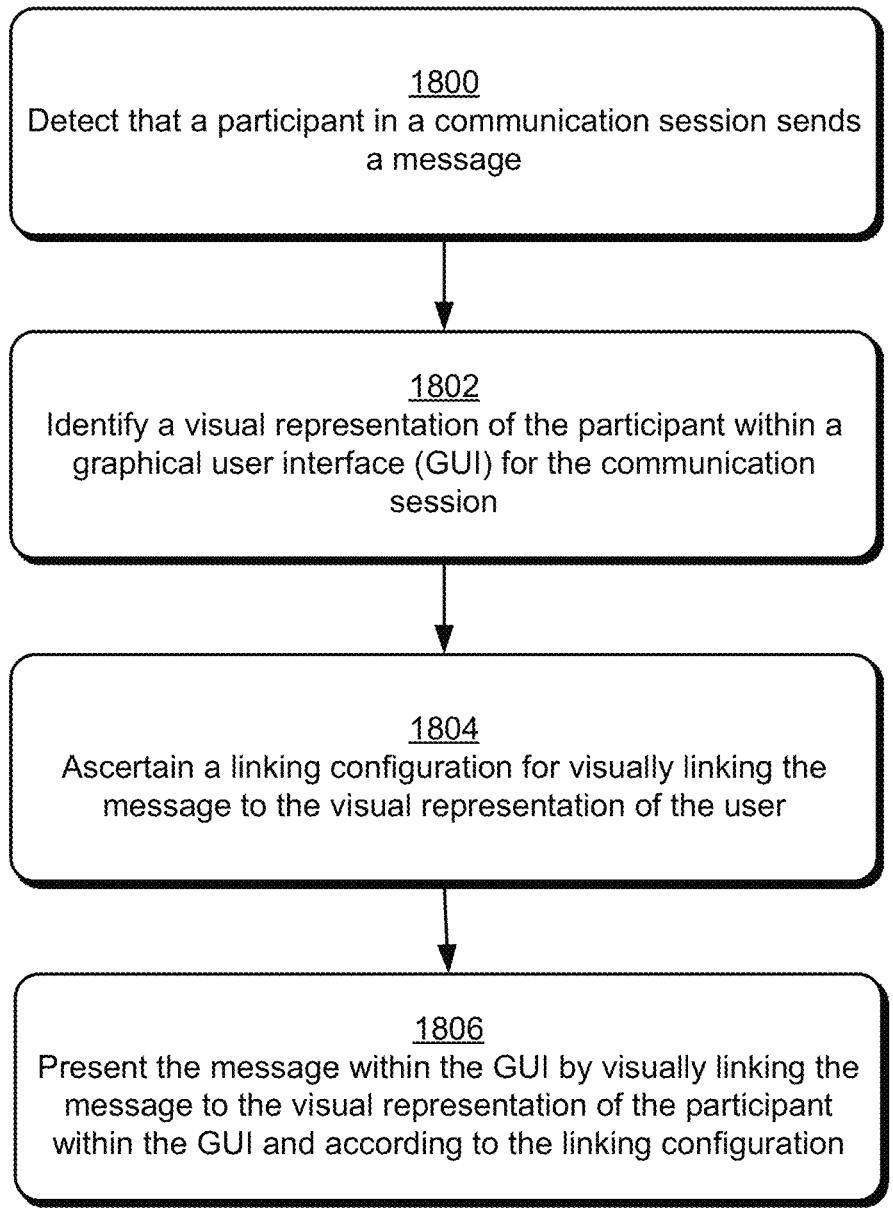
FIG. 18 is a flow diagram that describes steps in a method for presenting a message from a participant in a communication session in accordance with one or more embodiments.

FIG. 18 is a flow diagram that describes steps in a method in accordance with one or more implementations. The method describes an example procedure for presenting a message from a participant in a communication session in accordance with one or more implementations.

Step 1800 detects that a participant in a communication session sends a message. The messaging module 128, for instance, detects that a participant in a communication session generates a message via input to a client device 102. The message includes one or more types of media, such as text, an image, a hyperlink, and so forth.

Step 1802 identifies a visual representation of the participant within a graphical user interface (GUI) for the communication session. The layout module 122, for example, ascertains a region of the GUI in which a user visual for the participant is displayed. Generally, the GUI includes visual representations for different participants in the communication session, and the layout module 122 is configured to differentiate between the different visual representations.

Step 1804 ascertains a linking configuration for visually linking the message to the visual representation of the user. Generally, the linking configuration represents rendering logic that specifies a visual relationship between the visual representation of the participant and the message to be presented. In at least some implementations, the linking configuration is based on whether the user is an active participant or a passive participant in the communication session. Example ways of ascertaining whether a participant is an active participant or a passive participant are discussed above.

Step 1806 presents at least a portion of the message within the GUI by visually linking the message to the visual representation of the participant within the GUI and according to the linking configuration. Generally, the visual linking visually ties the message to the visual representation and provides a visual indication that the message was sent by a user represented by the visual representation. Examples of different visual linking techniques are depicted in the example implementations scenarios described above, such as overlaying the message on the visual representation, presenting the message adjacent to the visual representation, and so forth.

In at least some implementations, visually linking the message to the visual representation is based on whether the participant is an active participant or a passive participant. For instance, an active participant has a different linking configuration than a passive participant. Thus, messages may be presented in different ways dependent on different participant types.

Figure 19:
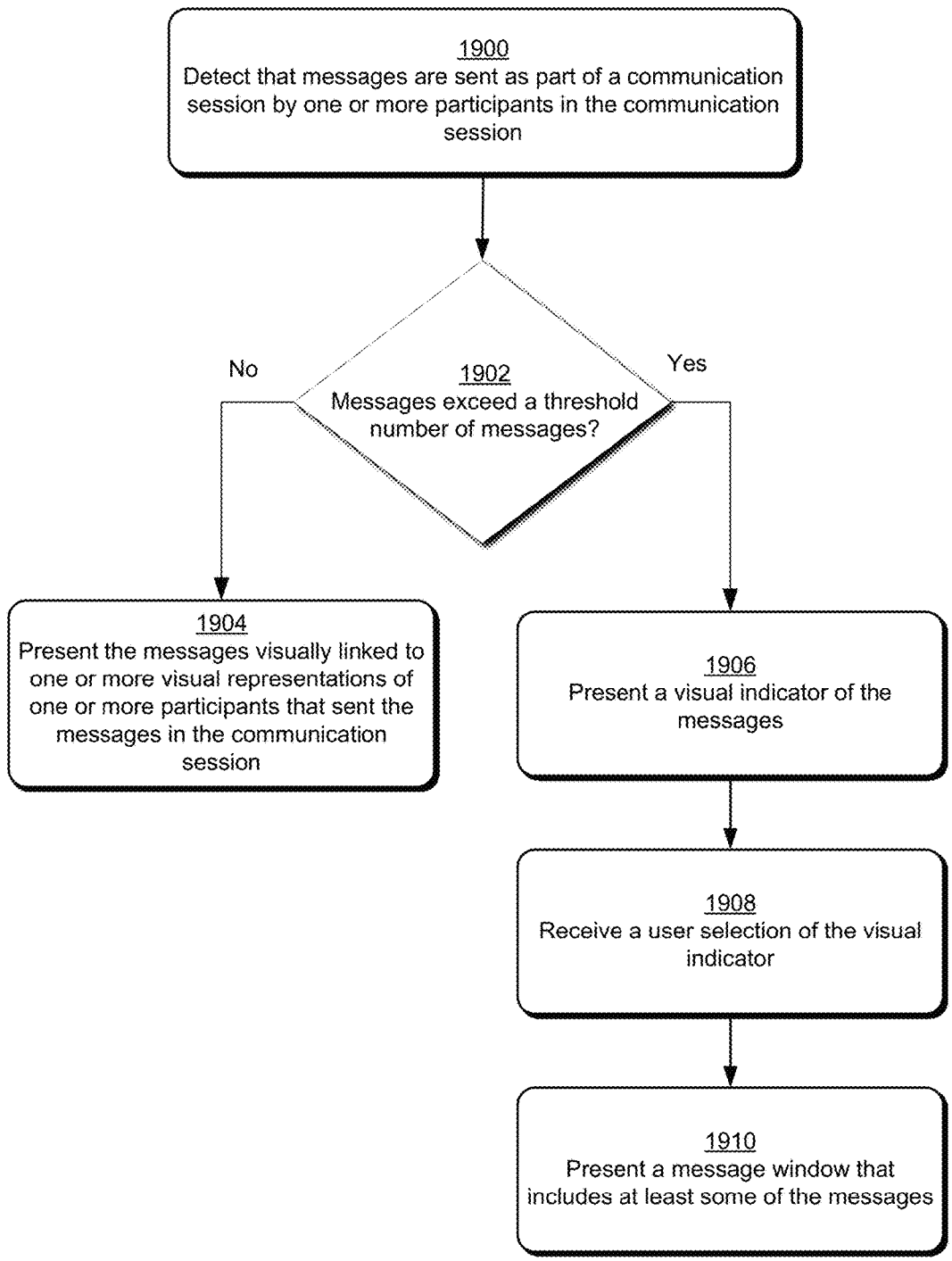
FIG. 19 is a flow diagram that describes steps in a method for presenting messages based on a threshold number of messages for a communication session in accordance with one or more embodiments.

FIG. 19 is a flow diagram that describes steps in a method in accordance with one or more implementations. The method describes an example procedure for presenting messages based on a threshold number of messages for a communication session in accordance with one or more implementations.

Step 1900 detects that messages are sent as part of a communication session by one or more participants in the communication session. The messaging module 128, for instance, detects that a number of messages are sent by one or more participants in a communication session.

Step 1902 ascertains whether the messages exceed a threshold number of messages sent over a specified period of time. The messaging module 128, for example, tracks a rate at which messages are sent during a communication session, such as messages per second during the communication session. For instance, if several users are sending messages at the same time and/or in close succession, the messaging module 128 detects a high message rate. Thus, the message threshold may represent a message rate.

In at least some implementations, the message threshold is based on a size (e.g. area, length, width, and so forth) of a GUI for the communication session. A large GUI, for example, may have a higher message threshold than a small GUI. For instance, a large GUI is able to display more messages than a small GUI, and thus has a higher message threshold than a small display. Accordingly, the messaging module 128 determines the message threshold by ascertaining a size of a GUI for the communication session, and adjusting the message threshold based on the size.

If the messages do not exceed the threshold number of messages ("No"), step 1904 presents the messages visually linked to one or more visual representations of one or more participants that sent the messages in the communication session. The messages, for instance, are presented visually linked to a live video feed and/or an avatar for one or more participants in a GUI for the communication session. Example ways for visually linking a message to a visual representation of a participant are detailed above.

If the messages exceed the threshold number of messages ("Yes"), step 1906 presents a visual indicator of the messages. The messages, for instance, are not automatically displayed in a GUI for the communication session. The visual indicator generally represents an icon or other graphic that provides a visual cue that messages are available to be viewed, but does not include the messages themselves. In at least some implementations, user visuals for participants that send the messages are highlighted to indicate participants from which the messages originate.

Step 1908 receives a user selection of the visual indicator. For instance, the messaging module 128 ascertains that a user provides input to select the visual indicator.

Step 1910 presents a message window that includes at least some of the messages. The message window is presented in response to the user selection of the visual indicator, and includes media for at least some of the messages. Further, participants may interact with the message window to generate further messages.

Thus, in at least some implementations, when the messages exceed the message threshold, the messages are stored for later presentation and are not presented unless a user selects the visual indicator. For instance, the messages are not presented independent of user input requesting presentation of the messages.

Accordingly, techniques described herein enable messages sent during a communication session to be presented in an intuitive manner such that the messages are easily viewable without obscuring other visual aspects of the communication session.

Having discussed some example procedures, consider now a discussion of an example system and device in accordance with one or more embodiments.

Example System and Device

Figure 20:
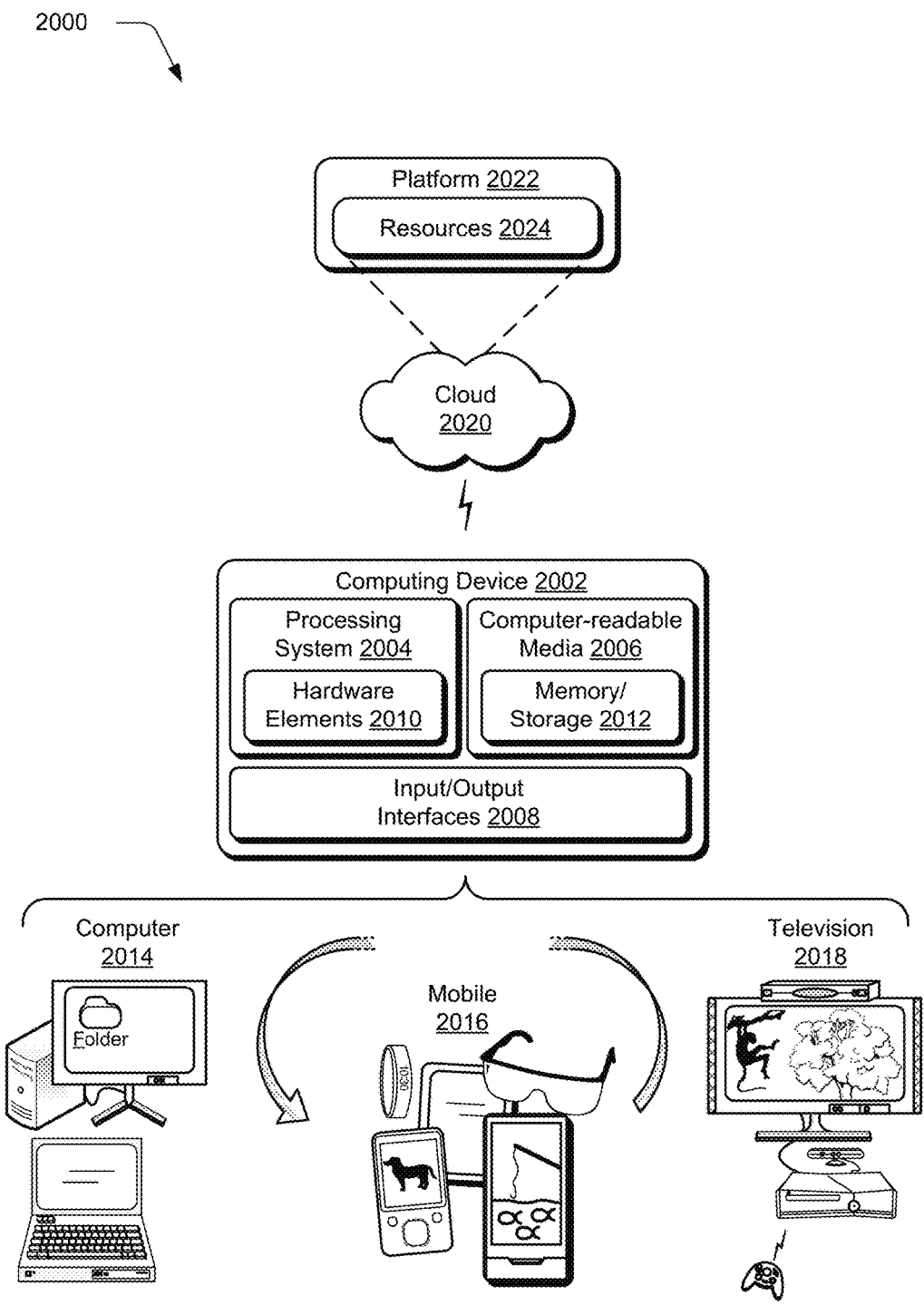
FIG. 20 illustrates an example system and computing device as described with reference to FIG. 1, which are configured to implement embodiments of techniques described herein.

FIG. 20 illustrates an example system generally at 2000 that includes an example computing device 2002 that is representative of one or more computing systems and/or devices that may implement various techniques described herein. For example, the client device 102 and/or the communication service 118 discussed above with reference to FIG. 1 can be embodied as the computing device 2002. The computing device 2002 may be, for example, a server of a service provider, a device associated with the client (e.g., a client device), an on-chip system, and/or any other suitable computing device or computing system.

The example computing device 2002 as illustrated includes a processing system 2004, one or more computer-readable media 2006, and one or more Input/Output (I/O) Interfaces 2008 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware element 2010 that may be configured as processors, functional blocks, and so forth. This may include implementation in hardware as an application specific integrated circuit or other logic device formed using one or more semiconductors. The hardware elements 2010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 2006 is illustrated as including memory/storage 2012. The memory/storage 2012 represents memory/storage capacity associated with one or more computer-readable media. The memory/storage 2012 may include volatile media (such as random access memory (RAM)) and/or nonvolatile media (such as read only memory (ROM), Flash memory, optical disks, magnetic disks, and so forth). The memory/storage 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 2010 and computer-readable media 2006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of modules that are executable by the computing device 2002 as software may be achieved at least partially in hardware, e.g., through use of computer-readable storage media and/or hardware elements 2010 of the processing system. The instructions and/or functions may be executable/operable by one or more articles of manufacture (for example, one or more computing devices 2002 and/or processing systems 2004) to implement techniques, modules, and examples described herein.

As further illustrated in FIG. 20, the example system 2000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2002 may assume a variety of different configurations, such as for computer 2014, mobile 2016, and television 2018 uses. Each of these configurations includes devices that may have generally different constructs and capabilities, and thus the computing device 2002 may be configured according to one or more of the different device classes. For instance, the computing device 2002 may be implemented as the computer 2014 class of a device that includes a personal computer, desktop computer, a multi-screen computer, laptop computer, netbook, and so on.

The computing device 2002 may also be implemented as the mobile 2016 class of device that includes mobile devices, such as a mobile phone, portable music player, portable gaming device, a tablet computer, a wearable device, a multi-screen computer, and so on. The computing device 2002 may also be implemented as the television 2018 class of device that includes devices having or connected to generally larger screens in casual viewing environments. These devices include televisions, set-top boxes, gaming consoles, and so on.

The techniques described herein may be supported by these various configurations of the computing device 2002 and are not limited to the specific examples of the techniques described herein. For example, functionalities discussed with reference to the communication client 110 and/or the communication service 118 may be implemented all or in part through use of a distributed system, such as over a "cloud" 2020 via a platform 2022 as described below.

The cloud 2020 includes and/or is representative of a platform 2022 for resources 2024. The platform 2022 abstracts underlying functionality of hardware (e.g., servers) and software resources of the cloud 2020. The resources 2024 may include applications and/or data that can be utilized while computer processing is executed on servers that are remote from the computing device 2002. Resources 2024 can also include services provided over the Internet and/or through a subscriber network, such as a cellular or Wi-Fi network.

The platform 2022 may abstract resources and functions to connect the computing device 2002 with other computing devices. The platform 2022 may also serve to abstract scaling of resources to provide a corresponding level of scale to encountered demand for the resources 2024 that are implemented via the platform 2022. Accordingly, in an interconnected device embodiment, implementation of functionality described herein may be distributed throughout the system 2000. For example, the functionality may be implemented in part on the computing device 2002 as well as via the platform 2022 that abstracts the functionality of the cloud 2020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for visually presenting a message in a communication session, the system including: at least one processor; and one or more computer-readable storage media including instructions stored thereon that, responsive to execution by the at least one processor, cause the system perform operations including: detecting that a participant in a communication session sends a message; identifying a visual representation of the participant within a graphical user interface (GUI) for the communication session; ascertaining a linking configuration for visually linking the message to the visual representation of the user based on whether the user is an active participant or a passive participant in the communication session; and presenting at least a portion of the message within the GUI by visually linking the message to the visual representation of the participant within the GUI and according to the linking configuration.

Example 2

A system as described in example 1, wherein the graphical representation includes a video feed that includes a live image of the user.

Example 3

A system as described in one or more of examples 1 or 2, wherein said identifying includes identifying a region of a display in which the visual representation is displayed.

Example 4

A system as described in one or more of examples 1-3, wherein said ascertaining includes ascertaining an active participant linking configuration based on the participant being tagged as an active participant in the communication session.

Example 5

A system as described in one or more of examples 1-4, wherein said ascertaining includes ascertaining a passive participant linking configuration based on the participant being tagged as a passive participant in the communication session.

Example 6

A system as described in one or more of examples 1-5, wherein a linking configuration for an active participant is different than a linking configuration for a passive participant.

Example 7

A system as described in one or more of examples 1-6, wherein said ascertaining includes ascertaining an active participant linking configuration based on the participant being tagged as an active participant in the communication session, and wherein said presenting includes presenting the at least a portion of the message as an overlay over at least a portion of the visual representation of the participant according to the active participant linking configuration.

Example 8

A system as described in one or more of examples 1-7, wherein said ascertaining includes ascertaining a passive participant linking configuration based on the participant being tagged as a passive participant in the communication session, and wherein said presenting includes presenting the at least a portion of the message adjacent to the visual representation of the participant according to the passive participant linking configuration.

Example 9

A system as described in one or more of examples 1-8, wherein the GUI includes an active participant region and a passive participant region, and wherein said presenting includes presenting the at least a portion of the image in the active participant region or the passive participant region dependent on whether the participant is an active participant or a passive participant.

Example 10

A system as described in one or more of examples 1-9, wherein the operations further include: receiving further messages from participants in the communication session; ascertaining that the further messages exceed a message threshold that specifies a threshold number of messages over a specified period of time; and presenting a visual notification within the GUI that the further messages are available to be viewed.

Example 11

A computer-implemented method for visually presenting a message in a communication session, the method including: detecting that a participant in a communication session sends a message; identifying by a computing system a visual representation of the participant within a graphical user interface (GUI) for the communication session; ascertaining a linking configuration for visually linking the message to the visual representation of the user based on whether the user is an active participant or a passive participant in the communication session; and presenting by the computing system at least a portion of the message within the GUI by visually linking the message to the visual representation of the participant within the GUI and according to the linking configuration.

Example 12

A method as described in example 11, wherein the visual representation of the participant includes a live video feed of the participant, and wherein said presenting includes presenting the at least a portion of the message as an overlay on at least a portion of the live video feed.

Example 13

A method as described in one or more of examples 11 or 12, further including ascertaining that the participant is an active participant in the communication session, and wherein said presenting includes presenting the at least a portion of the message as a visual overlay over at least a portion of the visual representation of the participant based on said ascertaining.

Example 14

A method as described in one or more of examples 11-13, further including ascertaining that the participant is a passive participant in the communication session, and wherein said presenting includes presenting the at least a portion of the message adjacent to the visual representation of the participant based on said ascertaining.

Example 15

A method as described in one or more of examples 11-14, wherein said presenting includes presenting message media and an identifier for the participant as part of the at least a portion of the message.

Example 16

A computer-implemented method for presenting an indication of a message in a communication session, the method including: detecting that messages are sent as part of a communication session by one or more participants in the communication session; ascertaining whether the messages exceed a threshold number of messages sent over a specified period of time; and presenting an indication of the messages within a graphical user interface (GUI) for the communication session based on whether the messages exceed the threshold number of messages sent over the specified period of time.

Example 17

A method as described in example 16, wherein the threshold number of messages is determined based on a size of the GUI.

Example 18

A method as described in one or more of examples 16 or 17, wherein said ascertaining includes ascertaining that the messages do not exceed the threshold number of messages, and wherein said presenting includes presenting the messages in the GUI and visually linked to one or more visual representations of the one or more participants in the communication session.

Example 19

A method as described in one or more of examples 16-18, wherein said ascertaining includes ascertaining that the messages exceed the threshold number of messages, and wherein said presenting includes presenting a visual indicator that is selectable to cause the messages to be presented.

Example 20

A method as described in one or more of examples 16-19, wherein said ascertaining includes ascertaining that the messages exceed the threshold number of messages, wherein said presenting includes presenting a visual indicator that is selectable to cause the messages to be presented, the method further including: receiving a user selection of the visual indicator; and presenting a message window in the GUI that includes at least some of the messages.

CONCLUSION

Techniques for presenting a message in a communication session are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A system comprising:
   at least one processor; and
   one or more computer-readable storage media including instructions stored thereon that, responsive to execution by the at least one processor, cause the system perform operations including:
      detecting that a participant in a communication session sends a message;
      identifying a visual representation of the participant within a graphical user interface (GUI) for the communication session;
      ascertaining a linking configuration for visually linking the message to the visual representation based on the user being indicated as a passive participant in the communication session; and
      presenting at least a portion of the message within the GUI by visually linking the message to the visual representation of the participant within the GUI and according to the linking configuration, said visually linking including presenting the at least a portion of the message adjacent the visual representation of the participant according to a passive participant linking configuration.

2. A system as recited in claim 1, wherein the visual representation comprises a video feed that includes a live image of the user.

3. A system as recited in claim 1, wherein said identifying comprises identifying a region of a display in which the visual representation is displayed.

4. A system as recited in claim 1, wherein said ascertaining comprises ascertaining a passive participant linking configuration based on the participant being tagged as a passive participant in the communication session.

5. A system as recited in claim 1, wherein a linking configuration for an active participant is different than the linking configuration for a passive participant.

6. A system as recited in claim 1, wherein the operations further include:
detecting that a different participant in the communication session sends a different message; and
ascertaining an active participant linking configuration based on the different participant being tagged as an active participant in the communication session, and presenting at least a portion of the different message as an overlay over at least a portion of a visual representation of the different participant according to the active participant linking configuration.

7. A system as recited in claim 1, wherein the GUI includes an active participant region and a passive participant region, and wherein said presenting comprises presenting the at least a portion of the image in the passive participant region.

8. A system as recited in claim 1, wherein the operations further include:
receiving further messages from participants in the communication session;
ascertaining that the further messages exceed a message threshold that specifies a threshold number of messages over a specified period of time; and
presenting a visual notification within the GUI that the further messages are available to be viewed.

9. A computer-implemented method, comprising:
detecting that a participant in a communication session sends a message;
identifying by a computing system a visual representation of the participant within a graphical user interface (GUI) for the communication session;
ascertaining a linking configuration for visually linking the message to the visual representation based on the user being indicated as a passive participant in the communication session; and
presenting by the computing system at least a portion of the message within the GUI by visually linking the message to the visual representation of the participant within the GUI and according to the linking configuration, said visually linking including presenting the at least a portion of the message adjacent the visual representation of the participant according to a passive participant linking configuration.

10. A method as described in claim 9, wherein the visual representation of the participant comprises a live video feed of the participant, and wherein said presenting comprises presenting the at least a portion of the message adjacent at least a portion of the live video feed.

11. A method as described in claim 9, further comprising:
detecting that a different participant in the communication session sends a different message; and
ascertaining that the different participant is an active participant in the communication session, and presenting at least a portion of the different message as a visual overlay over at least a portion of a visual representation of the different participant.

12. A method as described in claim 9, wherein said presenting comprises presenting message media and an identifier for the participant as part of the at least a portion of the message.

13. A computer-implemented method, comprising:
detecting that messages are sent as part of a communication session by one or more participants in the communication session;
ascertaining whether the messages exceed a threshold number of messages sent over a specified period of time; and
presenting an indication of the messages within a graphical user interface (GUI) for the communication session based on whether the messages exceed the threshold number of messages sent over the specified period of time.

14. A method as described in claim 13, wherein the threshold number of messages is determined based on a size of the GUI.

15. A method as described in claim 13, wherein said ascertaining comprises ascertaining that the messages do not exceed the threshold number of messages, and wherein said presenting comprises presenting the messages in the GUI and visually linked to one or more visual representations of the one or more participants in the communication session.

16. A method as described in claim 13, wherein said ascertaining comprises ascertaining that the messages exceed the threshold number of messages, and wherein said presenting comprises presenting a visual indicator that is selectable to cause the messages to be presented.

17. A method as described in claim 13, wherein said ascertaining comprises ascertaining that the messages exceed the threshold number of messages, wherein said presenting comprises presenting a visual indicator that is selectable to cause the messages to be presented, the method further comprising:
receiving a user selection of the visual indicator; and
presenting a message window in the GUI that includes at least some of the messages.

18. A system as recited in claim 1, wherein the operations further include:
receiving further messages from participants in the communication session;
ascertaining based on the size of the GUI that the further messages exceed a message threshold that specifies a threshold number of messages over a specified period of time; and
presenting a visual notification within the GUI that the further messages are available to be viewed.

19. A system as recited in claim 1, wherein the operations further include:
receiving further messages from participants in the communication session;
ascertaining based on the size of the GUI that the further messages exceed a message threshold that specifies a threshold number of messages over a specified period of time;
presenting a visual notification within the GUI that the further messages are available to be viewed; and presenting a visual indicator that is selectable to cause the messages to be presented.

20. A method as recited in claim 9, further comprising:

receiving further messages from participants in the communication session;

ascertaining that the further messages exceed a message threshold that specifies a threshold number of messages over a specified period of time; and presenting a visual notification within the GUI that the further messages are available to be viewed.

* * * * *